United States Patent
Fisher et al.

(10) Patent No.: US 10,140,358 B2
(45) Date of Patent: Nov. 27, 2018

(54) PROGRESSIVE QUERY COMPUTATION USING STREAMING ARCHITECTURES

(71) Applicant: Microsoft Technology Licensing, LLC, Redmond, WA (US)

(72) Inventors: Danyel A. Fisher, Seattle, WA (US); Steven M. Drucker, Bellevue, WA (US); Jonathan D. Goldstein, Redmond, WA (US); Badrish Chandramouli, Redmond, WA (US); Robert A. DeLine, Seattle, WA (US); John C. Platt, Bellevue, WA (US); Mike Barnett, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/432,270

(22) Filed: Feb. 14, 2017

(65) Prior Publication Data

US 2017/0154098 A1 Jun. 1, 2017

Related U.S. Application Data

(63) Continuation of application No. 13/723,224, filed on Dec. 21, 2012, now Pat. No. 9,607,045.
(Continued)

(51) Int. Cl.
*G06F 17/00* (2006.01)
*G06F 17/30* (2006.01)

(52) U.S. Cl.
CPC .... *G06F 17/30598* (2013.01); *G06F 17/3051* (2013.01); *G06F 17/3053* (2013.01);
(Continued)

(58) Field of Classification Search
CPC ......... G06F 17/30516; G06F 17/30489; G06F 3/0481; G06F 17/2211; G06F 17/2247
See application file for complete search history.

(56) References Cited

U.S. PATENT DOCUMENTS 5,878,426 A 3/1999 Plasek et al.
6,052,689 A 4/2000 Muthukrishnan et al.
(Continued)

FOREIGN PATENT DOCUMENTS

CN 101551745 A 10/2009
WO 2014/011708 A2 1/2014
(Continued)

OTHER PUBLICATIONS

International Search Report and Written Opinion dated May 26, 2014 from PCT Patent Application No. PCT/US2013/049820, 14 pages.
(Continued)

*Primary Examiner* — Truong Vo
(74) *Attorney, Agent, or Firm* — Rainier Patents, P.S.

(57) ABSTRACT

The described implementations relate to processing of electronic data. One implementation is manifest as a technique that can include obtaining a relational query that references one or more data items and associating progress intervals with the data items. The technique can also include converting the relational query into a corresponding streaming query, and providing the streaming query and the data items with the progress intervals to a stream engine that produces incremental results of the query. For example, the progress intervals can be based on row numbers of a relational database table. The progress intervals can be used to define event lifetimes of streaming events that are provided as inputs to the stream engine.

20 Claims, 15 Drawing Sheets

Related U.S. Application Data

(60) Provisional application No. 61/671,038, filed on Jul. 12, 2012.

(52) U.S. Cl.
CPC .. *G06F 17/30486* (2013.01); *G06F 17/30516* (2013.01); *G06F 17/30551* (2013.01); *G06F 17/30595* (2013.01); *G06F 17/30867* (2013.01)

(56) References Cited

U.S. PATENT DOCUMENTS

| | | | |
|---|---|---|---|
| 6,108,658 | A | 8/2000 | Lindsay et al. |
| 6,477,534 | B1 | 11/2002 | Acharya et al. |
| 6,504,195 | B2 | 1/2003 | Guidash |
| 6,760,724 | B1 | 7/2004 | Chakrabarti et al. |
| 6,842,753 | B2 | 1/2005 | Chaudhuri et al. |
| 7,182,465 | B2 | 2/2007 | Fuchs et al. |
| 7,385,708 | B2 | 6/2008 | Ackerman et al. |
| 7,536,396 | B2 | 5/2009 | Johnson et al. |
| 7,567,949 | B2 | 7/2009 | Chaudhuri et al. |
| 7,636,707 | B2 | 12/2009 | Chaudhuri et al. |
| 7,650,331 | B1 | 1/2010 | Dean et al. |
| 7,716,215 | B2 | 5/2010 | Lohman et al. |
| 7,728,868 | B2 | 6/2010 | Razzaque et al. |
| 7,877,381 | B2 | 1/2011 | Ewen et al. |
| 7,882,138 | B1 | 2/2011 | Kumar |
| 7,890,444 | B2 | 2/2011 | Torres et al. |
| 8,032,554 | B2 | 10/2011 | Nishizawa et al. |
| 8,090,730 | B2 | 1/2012 | Shahabi et al. |
| 8,484,243 | B2 | 7/2013 | Krishnamurthy et al. |
| 8,553,034 | B2 | 10/2013 | Wong et al. |
| 8,572,068 | B2 | 10/2013 | Graefe et al. |
| 8,959,651 | B2 | 2/2015 | Li et al. |
| 8,983,936 | B2 | 3/2015 | Fisher et al. |
| 9,436,740 | B2 | 9/2016 | Fisher et al. |
| 2004/0002956 | A1 | 1/2004 | Chaudhuri et al. |
| 2004/0249810 | A1 | 12/2004 | Das et al. |
| 2006/0031209 | A1 | 2/2006 | Ahlberg et al. |
| 2006/0106793 | A1 | 5/2006 | Liang |
| 2007/0016612 | A1 | 1/2007 | James et al. |
| 2007/0226178 | A1 | 9/2007 | Ewen et al. |
| 2008/0072180 | A1 | 3/2008 | Chevalier et al. |
| 2008/0077530 | A1 | 3/2008 | Banas et al. |
| 2008/0250357 | A1 | 10/2008 | Lee et al. |
| 2008/0306919 | A1 | 12/2008 | Iwayama et al. |
| 2009/0187467 | A1* | 7/2009 | Fang ................ G06F 17/30699 705/7.29 |
| 2009/0228434 | A1 | 9/2009 | Krishnamurthy et al. |
| 2009/0252404 | A1 | 10/2009 | Lecerf |
| 2009/0271529 | A1* | 10/2009 | Kashiyama ....... G06F 17/30477 710/1 |
| 2009/0322754 | A1 | 12/2009 | Robertson et al. |
| 2009/0322756 | A1 | 12/2009 | Robertson et al. |
| 2010/0268067 | A1 | 2/2010 | Razzaque et al. |
| 2010/0225661 | A1 | 9/2010 | Gorisch et al. |
| 2010/0241646 | A1 | 9/2010 | Friedman et al. |
| 2011/0047120 | A1 | 2/2011 | Kamvar et al. |
| 2011/0084967 | A1 | 4/2011 | De Pauw et al. |
| 2011/0167110 | A1 | 7/2011 | Hoffberg et al. |
| 2011/0258183 | A1 | 10/2011 | Gibbs et al. |
| 2011/0302164 | A1 | 12/2011 | Krishnamurthy et al. |
| 2011/0310112 | A1 | 12/2011 | Zolotovitski |
| 2011/0314021 | A1 | 12/2011 | Gibbs et al. |
| 2012/0047125 | A1 | 2/2012 | Day et al. |
| 2012/0054173 | A1 | 3/2012 | Andrade et al. |
| 2012/0078939 | A1 | 3/2012 | Chen et al. |
| 2012/0089642 | A1 | 4/2012 | Milward et al. |
| 2012/0158708 | A1 | 6/2012 | Gillet et al. |
| 2012/0311581 | A1 | 12/2012 | Balmin et al. |
| 2013/0030860 | A1 | 1/2013 | Chaubey et al. |
| 2013/0046756 | A1 | 2/2013 | Hao et al. |
| 2013/0117257 | A1 | 5/2013 | Meijer et al. |
| 2013/0124097 | A1 | 5/2013 | Thorne |
| 2013/0179466 | A1 | 7/2013 | Mizobuchi et al. |
| 2013/0194271 | A1 | 8/2013 | Roesch et al. |
| 2014/0082178 | A1 | 3/2014 | Boldyrev et al. |
| 2014/0095525 | A1 | 4/2014 | Hsiao et al. |
| 2014/0372438 | A1 | 12/2014 | Chanramouli et al. |
| 2015/0269228 | A1 | 9/2015 | Fisher et al. |
| 2017/0371924 | A1 | 12/2017 | Ding et al. |

FOREIGN PATENT DOCUMENTS

| | | |
|---|---|---|
| WO | 2014/200877 A1 | 12/2014 |
| WO | 2015138497 A2 | 9/2015 |

OTHER PUBLICATIONS

PCT Demand under Article 34 filed Aug. 26, 2014 from PCT Patent Application No. PCT/US2013/049820, 18 pages.
Written Opinion dated Sep. 24, 2014 from PCT Patent Application No. PCT/US2013/049820, 10 pages.
International Search Report and Written Opinion from PCT Patent Application No. PCT/US2014/041450 dated Nov. 25, 2014, 15 pages.
PCT Demand and Article 34 filed Mar. 11, 2015 from PCT Patent Application No. PCT/US2014/041450, 18 pages.
Written Opinion dated Apr. 22, 2015 from PCT Patent Application No. PCT/US2014/041450, 9 pages.
Fisher et al., "Using Streaming Architectures to Compute Progressive Visualization," U.S. Appl. No. 61/671,038, filed Jul. 12, 2012, 48 pages.
Voluntary Amendment filed Jul. 1, 2015 from Chinese Patent Application No. 201380037221.X, 7 pages.
International Preliminary Report on Patentability dated Aug. 12, 2015 from PCT Patent Application No. PCT/US2014/041450, 18 pages.
Golab et al., "Stream Warehousing with DataDepot," SIGMOD '09, Jun. 29-Jul. 2, 2009, Providence, RI, 7 pages.
Seow, S., "Designing and Engineering Time: the Psychology of Timer Perception in Software," Boston: Pearson Education, 2008, 251 pages.
Notice of Allowance dated Aug. 22, 2016 from U.S. Appl. No. 13/915,632, 10 pages.
Advisory Action dated Jun. 10, 2016 from U.S. Appl. No. 13/439,650, 3 pages.
Notice of Appeal and Pre-Appeal Brief Request filed Jun. 30, 2016 from U.S. Appl. No. 13/439,650, 9 pages.
Notice of Panel Decision from Pre-Appeal Brief Review dated Jul. 13, 2016 from U.S. Appl. No. 13/439,650, 2 pages.
Response filed Nov. 4, 2015 to the Non-Final Office Action dated May 21, 2015 from U.S. Appl. No. 13/439,650, 14 pages.
Final Office Action dated Feb. 12, 2016 from U.S. Appl. No. 13/439,650, 6 pages.
Response filed May 3, 2016 to the Final Office Action dated Feb. 12, 2016 from U.S. Appl. No. 13/439,650, 11 pages.
Response filed Feb. 3, 2016 to the Final Office Action mailed Aug. 6, 2015 from U.S. Appl. No. 13/915,632, 23 pages.
Notice of Allowance dated Apr. 13, 2016 from U.S. Appl. No. 13/915,632, 9 pages.
Hoeeffding, Wassily, "Probability Inequalities for Sums of Bounded Random Variables," Journal of the American Statistical Association 58 (301), Mar. 1963, pp. 13-30, 18 pages.
Kramer et al., "A Temporal Foundation for Continuous Queries over Data Streams," COMAD, 2005, 13 pages.
Srivastava et al., "Flexible Time Management in Data Stream Systems," PODS 2004, Jun. 14-16, 2004, Paris, France, 11 pages.
Viglas et al., "Rate-Based Query Optimization for Streaming Information Sources," SIGMOD'2002, Jun. 4-6, 2002, Madison Wisconsin, 13 pages.
Barnett et al., "Stat!—An Interactive Analytics Environment for Big Data," SIGMOD '13, Jun. 22-27, 2013, New York, New York, 4 pages.
Meijer, Erik, "The World According to LINQ", Communications of the ACM, vol. 54, No. 10, Oct. 2011, pp. 45-51, 7 pages.

(56) References Cited

OTHER PUBLICATIONS

Microsoft, "StreamInsight," retreived at <<http://www.microsoft.com/sqlserver/en/us/solutions-technologies/business-intelligence.com on Aug. 30, 2012, 2 pages.

Garrett et al., "Real-Time Incremental Visualization of Dynamic Ultrasound Volumes Using Parallel BSP Trees," Department of Computer Science, University of North Carolina at Chapel Hill, Published in IEEE Visualization '96, Oct. 27-Nov. 1, 1996, pp. 235-240, 7 pages.

Gates et al., "Building a High-Level Dataflow System on Top of Map-Reduce: The Pig Experience," VLDB '09, vol. 2, No. 2, Aug. 24-28, 2009, 12 pages.

Ghemawat et al., "The Google File System", in SOSP '03, Oct. 19-22, 2003, 15 pages.

Gift, Noah, "Solve cloud-related big data problems with MapReduce," Retrieved on Feb. 20, 2013, at «http://www.ibm.com/developerworks/cloud/library/cl-bigdata/?cmp=dw&cpb=dwcld&ct=dwnew&cr=dwnen&ccy=zz&csr=111810», IBM DeveloperWorks, Nov. 8, 2010, 6 pages.

Gilbert, George, "Real-time query for Hadoop democratizes access to big data analytics," Oct. 22, 2012, Giga Omni Media, Inc., Retrieved on Feb. 20, 2013, at <<http://www.cloudera.com/content/dam/cloudera/Resources/PDF/GigaOM_Cloudera_Real-time_query_for_Hadoop_democratizes_access_to_big_data_analytics.pdf», 18 pages.

Lup et al., "A Scalable Hash Ripple Join Algorithm," Proceedings of the 2002 ACM SIGMOD International Conference on Management of Data (SIGMOD '02), ACM, Jun. 4-6, 2002, Madison, Wisconsin, 11 pages.

Graefe, Goetz, "The Cascades Framework for Query Optimization," Data Engineering Bulletin, vol. 18, 1995, 10 pages.

Grover et al., "Extending Map-Reduce for Efficient Predicate-Based Sampling," IEEE 28th International Conference on Data Engineering, Apr. 1, 2012, pp. 486-497, 12 pages.

Haas et al., "Ripple Joins for Online Aggregation," Proceedings of ACM SIGMOD International Conference on Management of Data, 1999, 12 pages.

Haas et al., "The Need for Speed: Speeding Up DB2 UDB Using Sampling," IDUG Solutions Journal, vol. 10, No. 2, Sep. 2003, 4 pages.

Haas et al., "Research Report, Join Algorithms for Online Aggregation", IBM Research Report RJ 10126 (95001), IBM Almaden Research, Jun. 30, 1998, 42 pages.

Hall et al., "Processing a Trillion Cells per Mouse Click," Proceedings of the VLDB Endowment, vol. 5, No. 11, Aug. 27, 2012, pp. 1436-1446, 11 pages.

Hammad et al., "Nile: A Query Processing Engine for Data Streams," Proceedings of the 20th International Conference on Data Engineering (ICDE'04), Mar. 30, 2004, 1 page.

Harris, Derrick, "Cloudera makes SQL a first-class citizen in Hadoop", GIGAOM, Oct. 24, 2012, Retrieved on Feb. 20, 2013, at «http:// gigaom.com/2012/10/24/cloudera-makes-sql-a-first-class-citizen-in-hadoop/», 5 pages.

He et al., "Comet: Batched Stream Processing for Data Intensive Distributed Computing," SoCC '10, Jun. 10-11, 2010, Indianapolis, IN, 12 pages.

Heer et al., "Animated Transitions in Statistical Data Graphics", IEEE Transactions on Visualization and Computer Graphics 13(6), Nov. 2007, 8 pages.

Hellerstein et al., "Informix under CONTROL: Online Query Processing," Journal of Data Mining and Knowledge Discovery, vol. 4, Issue 4, Oct. 2000, pp. 281-314, 34 pages.

Hu et al., "Demographic Prediction Based on User's Browsing Behavior", WWW 2007/Track: Data Mining, May 8-12, 2007, Banff, Alberta, Canada, 10 pages.

Isard et al., "Dryad: Distributed Data-Parallel Programs from Sequential Building Blocks," SIGOPS/EuroSys, 2007, Mar. 21-23, 2007, Lisboa, Portugal, 14 pages.

Jensen et al., "Temporal Specialization," Proceedings of the Eighth International Conference on Data Engineering, Feb. 2, 1992, pp. 594-603, 10 pages.

Jermaine et al., "Scalable Approximate Query Processing With The DBO Engine," Proceedings of the ACM SIGMOD International Conference on Management of Data (SIGMOD '07), Jun. 12-14, 2007, pp. 725-736, 12 pages.

Joshi et al., "Materialized Sample Views for Database Approximation," IEEE Transactions on Knowledge and Data Engineering, vol. 20(3), Mar. 2008, 15 pages.

Koh et al., "ManiWordle: Providing Flexible Control Over Wordle," IEEE Transactions on Visualization and Computer Graphics 16(6), Nov. 2010, 8 pages.

Kosara et al., "Semantic Depth of Field," Proceedings of the IEEE Symposium on Information Visualization 2001, (INFOVIS'01), IEEE Computer Society, 2001, 8 pages.

Kwon et al., "Skewtune: Mitigating Skew in MapReduce Applications," SIGMOD '12, May 20-24, 2012, Scottsdale, AZ, 12 pages.

Laptev et al., "Early Accurate Results for Advanced Analytics on MapReduce," Proceedings of the VLDB Endowment, vol. 5, No. 10, Aug. 27, 2012, Istanbul, Turkey, pp. 1028-1039, 12 pages.

Li et al., "A Platform for Scalable One-Pass Analytics Using MapReduce," Proceedings of the ACM SIGMOD International Conference on Management of Data (SIGMOD '11), Jun. 12-16, 2011, Athens, Greece, 12 pages.

Loboz et al., "DataGarage: Warehousing Massive Performance Data on Commodity Servers," Proceedings of the VLDB Endowment, vol. 3, No. 2, 2010, 12 pages.

Logothetis et al., "Stateful Bulk Processing for Incremental Analytics," SoCC '10, Jun. 10-11, 2010, Indianapolis, IN, 12 pages.

Yan et al., "How much can Behavioral Targeting Help Online Advertising?" WWW 2009, Apr. 20-24, 2009, Madrid, Spain, 10 pages.

Yu et al., "DryadLINQ: A System for General-Purpose Distributed Data-Parallel Computing Using a High-Level Language," Proceedings of the 8th USENIX Conference on Operating Systems Design and Implementation (OSDI 08), USENIX Association, Berkeley, CA, USA, 2008, 14 pages.

Zaharia et al., "Resilient Distributed Datasets: A Fault-Tolerant Abstraction for In-Memory Cluster Computing," Proceedings of the 9th USENIX Conference on Networked Systems Design and Implementation (NSDI'12), Apr. 25, 2012, 14 pages.

Zaharia et al., "Discretized Streams: An Efficient and Fault-Tolerant Model for Stream Processing on Large Clusters," HotCloud, 2012, 6 pages.

Zhou et al., "Incorporating Partitioning and Parallel Plans into the SCOPE Optimizer", ICDE, 2010, 12 pages.

Zuk et al., "Visualization of Uncertainty and Reasoning", in Proceedings of the 8th International Symposium on Smart Graphics (SG'07), Springer-Verlag, Berlin, Heidelberg, 2007, 14 pages.

Non-Final Office Action dated May 14, 2013 from U.S. Appl. No. 13/439,563, 7 pages.

Response filed Sep. 12, 2013 to the Non-Final Office Action dated May 14, 2013 from U.S. Appl. No. 13/439,563, 9 pages.

Final Office Action dated Nov. 1, 2013 from U.S. Appl. No. 13/439,563, 8 pages.

RCE and Amendment filed Feb. 3, 2014 from U.S. Appl. No. 13/439,563, 13 pages.

Non-Final Office Action dated May 9, 2014 from U.S. Appl. No. 13/439,563, 10 pages.

Response filed Aug. 11, 2014 to the Non-Final Office Action dated May 9, 2014 from U.S. Appl. No. 13/439,563, 9 pages.

Notice of Allowance dated Oct. 28, 2014 from U.S. Appl. No. 13/439,563, 9 pages.

Non-Final Office Action dated Jun. 16, 2014 from U.S. Appl. No. 13/439,650, 33 pages.

Response filed Sep. 16, 2014 to the Non-Final Office Action dated Jun. 16, 2014 from U.S. Appl. No. 13/439,650, 19 pages.

Non-Final Office Action dated May 21, 2015 from U.S. Appl. No. 13/439,650, 5 pages.

Amendment and Response filed Sep. 3, 2013 to the Notice to File Corrected Application Papers dated Jul. 12, 2013 from U.S. Appl. No. 13/915,632, 95 pages.

(56) References Cited

OTHER PUBLICATIONS

Non-Final Office Action dated Mar. 12, 2015 from U.S. Appl. No. 13/915,632, 10 pages.
Amendment and Response filed Jun. 12, 2015 to the Non-Final Office Action dated Mar. 12, 2015 from U.S. Appl. No. 13/915,632, 14 pages.
Final Office Action dated Aug. 6, 2015 from U.S. Appl. No. 13/915,632, 11 pages.
Freedman, D.A., "Statistical Models: Theory and Practice", Cambridge University Press, 2005. (Book).
Luo et al., "Query Merging for Data Processing in the Cloud," Retrieved on Feb. 20, 2013, at «http://www.cs.duke. edu/-fanyang/file/296_final_report.pdf», final report on project at Duke University, 5 pages.
Maron et al., "Hoeffding Races: Accelerating Model Selection Search for Classification and Function Approximation," Advances in Neural Information Processing Systems, vol. 6., 1994, pp. 59-66, 8 pages.
McKay et al., "Comparison of Three Methods for Selecting Values of Input Variables in the Analysis of Output from a Computer Code", Technometrics, vol. 21, No. 2, 1979, 7 pages.
Melnik et al., "Dremel: Interactive Analysis of Web-Scale Datasets," 36th International Conference on Very Large Databases, Proceedings of the VLDB Endowment vol. 3, No. 1, Sep. 13, 2010, pp. 330-339, 10 pages.
Michael et al., "Simple, Fast, and Practical Non-Blocking and Blocking Concurrent Queue Algorithms," Proceedings of the 15th annual Symposium on Principles of Distributed Computing, Philadelphia, May 23-26, 1996. 9 pages.
Neumeyer et al., "S4: Distributed Stream Computing Platform," KDCloud, 2010, 8 pages.
Olken et al., "Random Sampling from Database Files: A Survey," Proceedings of the 5th International Conference on Statistical and Scientific Database Management (SSDBM'1990), Zbigniew Michaelewicz (Ed)., Springer-Verlag, London, UK, 92-111, 1990, 20 pages.
Olston et al., "Pig Latin: A Not-so-Foreign Language for Data Processing," Proceedings of the 2008 ACM SIGMOD International Conference on Management of Data (SIGMOD '08), ACM, Jun. 9-12, 2010, New York, NY, USA, 12 pages.
Pansare et al., "Online Aggregation for Large MapReduce Jobs," VLDB '11, vol. 4, Issue 11, Aug. 29-Sep. 3, 2011, Seattle, WA, 11 pages.
Pike et al., "Interpreting the data: Parallel analysis with Sawzall," Scientific Programming, vol. 13, No. 4, Oct. 2005, pp. 277-298, 22 pages.
Piringer et al., "A Multi-Threading Architecture to Support Interactive Visual Exploration," IEEE Transactions on Visualization and Computer Graphics (2009), vol. 15, Issue 6, Nov.-Dec. 2009, published via internet on Oct. 11, 2009, pp. 1113-1120, 8 pages.
"Process Progress Dialog Box (Analysis Services—Multidimensional Data)," Retrieved on Feb. 20, 2013, at «http:// technet.microsoft.com/en-us/library/ms190131(v=sql.105).aspx», Microsoft, 2 pages.
Raman et al., "Online Dynamic Reordering for Interactive Data Processing," Proceedings of the 25th International Conference on Very Large Data Bases (VLDB '99 ), Sep. 7, 1999, 19 pages.
Robertson et al., "Effectiveness of Animation in Trend Visualization," IEEE Transactions on Visualization and Computer Graphics, 14(6), 1325-1332, Nov. 2008, 8 pages.
Rowstron et al., "Nobody ever got fired for using Hadoop on a cluster," Proceedings of the 1st International Workshop on Hot Topics in Cloud Data Processing (HotCDP 2012), Article No. 2, Apr. 10, 2012, 5 pages.
Rusu et al., "Statistical Analysis of Sketch Estimators," Proceedings of the 2007 ACM SIGMOD International Conference on Management of Data (SIGMOD '07), 2007, ACM, New York, NY, USA, 187-198, 12 pages.
Ryvkina et al., "Revision Processing in a Stream Processing Engine: A High-Level Design," Proceedings of the 22nd International Conference on Data Engineering (ICDE'06), Apr. 3, 2006, 3 pages.
Salton et al., "Term-Weighting Approaches in Automatic Text Retrieval," Information Processing & Management, vol. 24, No. 5, 1988, pp. 513-523, 11 pages.
Sato, Kazunori., "An Inside Look at Google BigQuery", Retrieved on Feb. 20, 2013, at «https://cloud.google.com/files/BigQueryTechnicalWP.pdf», Google, Inc., 12 pages.
Shneiderman, B., "Extreme Visualization: Squeezing a Billion Records into a Million Pixels," Proceedings of the 2008 ACM SIGMOD International Conference on Management of Data (SIGMOD '08), pp. 3-12, 2008, 10 pages.
Simonson et al., "A DBMS for the U.S. Bureau of the Census," Proceedings of the 1st International Conference on Very Large Data Bases (VLDB '75), ACM, New York, NY, USA, 496-498, 1975, 3 pages.
Skeels et al., "Revealing Uncertainty for Information Visualization," Proceedings of the Working Conference on Advanced Visual Interfaces, ACM, New York, NY, USA, 2008, 376-379, 4 pages.
Smith et al., "FacetMap: A Scalable Search and Browse Visualization," IEEE Transactions on Visualization and Computer Graphics, vol. 12, No. 5, Sep. 2006, pp. 797-804, 8 pages.
Stonebraker et al., "C-store: A Column-oriented DBMS," Proceedings of the 31st International Conference on Very Large Databases (VLDB '05). VLDB Endowment, pp. 553-564, 12 pages.
Thomson et al., "A Typology for Visualizing Uncertainty," Proceedings of SPIE C& IS&T Conference on Electronic Imaging, Visualization and Data Analysis 2005, Jan. 16-20, 2005, 12 pages.
Tucker et al., "Exploiting Punctuation Semantics in Continuous Data Streams," IEEE Transactions on Knowledge and Data Engineering, vol. 15, No. 3, May/Jun. 2003, pp. 555-568, 14 pages.
Upadhyaya et al., "A Latency and Fault-Tolerance Optimizer for Online Parallel Query Plans," Proceedings of the ACM SIGMOD International Conference on Management of Data (SIGMOD'11 ), Jun. 12-16, 2011, 12 pages.
Viegas et al., "Participatory Visualization with Wordle," IEEE Transactions on Visualization and Computer Graphics, 15(6), 1137-1144, Nov. 2009, 8 pages.
White, Tom, "Hadoop: The Definitive Guide," Retrieved on Feb. 25, 2013, at «http://faculty.qu.edu.qa/malmeer/506499/0Reilly.Hadoop.The.Definitive.Guide.Jun.2009.pdf», O'Reilly, Yahoo! Press, 2009, 525 pages.
Wittenbrink et al., "Glyphs for Visualizing Uncertainty in Vector Fields," IEEE Transactions on Visualization and Computer Graphics, vol. 2, No. 3, Sep. 1996, pp. 266-279, 14 pages.
Response filed Jun. 23, 2017 to the First Office Action dated Feb. 17, 2017 from Chinese Patent Application No. 21380037221.X, 12 pages.
"Airline On-Time Performance and Causes of Flight Delays", Retrieved Apr. 4, 2012 at «http://explore.data.gov/d/ar4r-an9z», 1 page.
"Uncertainty Visualization", Retrieved Jan. 11, 2012 at «http ://spatial- analyst.neVwiki/index.php?title=Uncertainty_visualization», 11 pages.
Barga et al., "Consistent Streaming Through Time: A Vision for Event Stream Processing", Proceedings of CIDR, 2007, pp. 363-374, 11 pages.
Hellerstein et al., "Interactive Data Analysis: The Control Project", Computer, Aug. 1999, pp. 51-59, 9 pages.
Fisher, D., "Incremental, Approximate Database Queries and Uncertainty for Exploratory Visualization", Proceedings of IEEE Symposium on Large-Scale Data Analysis and Visualization, (LDAV), 2011, 8 pages.
Chandramouli et al., "Temporal Analytics on Big Data for Web Advertising", Proceedings of the 2012 IEEE 28th International Conference on Data Engineering, 2012, pp. 90-101, 12 pages.
Correa et al., "A Framework for Uncertainty-Aware Visual Analytics", Proceedings of IEEE Symposium on Visual Analytics Science and Technology (VAST 2009), 2009; pp. 51-58, 8 pages.
Esty et al., "The Box-Percentile Plot", Journal of Statistical Software, 8(17), 2003, pp. 1-14, 14 pages.

(56) References Cited

OTHER PUBLICATIONS

Fisher et al., "Trust Me, I'm Partially Right: Incremental Visualization Lets Analysts Explore Large Datasets Faster," CHI 2012, May 5-10, 2012, Austin, Texas, 10 pages.
Ali et al., "Microsoft CEP Server and Online Behavioral Targeting," Journal of Proceedings of the Very Large Database Endowment (VLDB '09), vol. 2, Issue 2, Aug. 24-28, 2009, 4 pages.
Babcock et al., "Models and Issues in Data Stream Systems," Proceedings of the Twenty-First ACM SIGMOD-SIGACT-SIGART Symposium on Principles of Database Systems (PODS '02), Jun. 3, 2002, 16 pages.
Bain, Dr. William, "Using In-Memory Computing to Simplify Big Data Analytics," Retrieved on Feb. 20, 2013 at <<http://www.datanami.com/datanami/2012-10-02/using_in-memory_computing_to_simplify_big_data_analytics.html»>, Datanami, Oct. 2, 2012, 5 pages.
Balazinska et al., "Fault-Tolerance in the Borealis Distributed Stream Processing System," SIGMOD, Jun. 14-16, 2005, 12 pages.
Barga et al., "Iterative MapReduce Research on Azure," Retrieved on Feb. 25, 2013, at «http://research.microsoft.com/en-us/people/barga/sc11daytona.pdf», International Conference for High Performance Computing, Networking, Storage and Analysis (SC 11), Nov. 12, 2011, 1 page.
Baudisch et al., "Phosphor: Explaining Transitions in the User Interface Using Afterglow Effects," Proceedings of the 19th Annual ACM Symposium on User Interface Software and Technology (UIST '06), Oct. 15-18, 2006, ACM, New York, NY, USA, pp. 169-178, 10 pages.
Bose et al., "Beyond Online Aggregation," Proceedings of the 2010 Workshop on Massive Data Analytics on the Cloud, Apr. 26, 2010, 6 pages.
Card et al., "The Information Visualizer, an Information Workspace," Proceedings of the SIGCHI Conference on Human Factors in Computing Systems: Reaching through technology (CHI '91), ACM, New York, NY, USA, 181-188, 1991, 8 pages.
Chaiken et al., "SCOPE: Easy and Efficient Parallel Processing of Massive Data Sets," VLDB '08, vol. 1, No. 2, Aug. 24-30, 2008, 12 pages.
Chan et al., "Maintaining Interactivity While Exploring Massive Time Series," Proceedings of IEEE VAST, Oct. 21-23, 2008, Columbus, Ohio, pp. 59-66, 8 pages.
Chandramouli et al., "Scalable Progressive Analytics on Big Data in the Cloud," Retrieved an Sep. 20, 2013 at «http://research.microsoft.com/pubs/200169/now-vldb.pdf», Proceedings of the VLDB Endowment, vol. 6, No. 14, 39th International Conference on Very Large Data Bases, Aug. 26, 2013, 12 pages.
Chang et al., "Bigtable: A Distributed Storage System for Structured Data," Proceedings of the 7th USENIX Symposium on Operating Systems Design and Implementation (OSDI '06), vol. 7, USENIX Association, Berkeley, CA, USA, 2006, pp. 205-218, 14 pages.
Chaudhuri et al., "An Overview of Data Warehousing and OLAP Technology," SIGMOD Record 26 (1), Mar. 1997, 10 pages.
Chaudhuri et al., "Effective Use of Block-Level Sampling in Statistics Estimation," Proceedings of the ACM SIGMOD International Conference on Management of Data, Jun. 13-18, 2004, 12 pages.
Chaudhuri et al., "On Random Sampling over Joins," Proceedings of the 1999 ACM SIGMOD International Conference on Management of Data (SIGMOD '99), 1999, pp. 263-274, 12 pages.
Chen et al., "Large-Scale Behavioral Targeting," KDD '09, Jun. 28-Jul. 1, 2009, Paris, France, pp. 209-217, 9 pages.
Codd, E.F., "A Relational Model of Data for Large Shared Data Banks", Communications of the ACM, vol. 13, No. 6, Jun. 1970, 11 pages.
Cohn et al., "Improving Generalization with Active Learning," Machine Learning, vol. 15, Issue 2, May 1994, pp. 201-221, 21 pages.
Condie et al., "MapReduce Online," Proceedings of the 7th USENIX Conference on Networked Systems Design and Implementation (NSDI'10), USENIX Association, Berkeley, CA, USA, 2010, 15 pages.
Cottam et al., "Bit by Bit: Incremental Data Visualization," Published Oct. 19, 2008, via Internet; IEEE Symposium on Information Visualization, 2009, 2 pages.
Das et al., "Google News Personalization: Scalable Online Collaborative Filtering," WWW 2007/Track Industrial Practice and Experience, May 8-12, 2007, Banff, Alberta, Canada, pp. 271-280, 10 pages.
Dean et al., "MapReduce: Simplified Data Processing on Large Clusters," Proceedings of 6th Symposium on Operating Systems Design and Implementation (OSDI '04), Dec. 6, 2004, pp. 137-149, 13 pages.
Deligiannidis et al.,"User-Centered Incremental Data Exploration and Visualization," LSDIS Lab and Computer Science, The University of Georgia, Athens, GA, 2008, 10 pages.
Diao, Yanlei, "Scalable, Low-Latency Data Analytics and its Applications," Retrieved on Feb. 20, 2013, at «http://www.comp.hkbu.edu.hk/v1/file/seminar/20120117 _Diao-2012public.pdf», University of Massachusetts, Amherst, 29 pages.
Doucet et al., "Efficient Block Sampling Strategies for Sequential Monte Carlo Methods," Journal of Computational and Graphical Statistics, vol. 15, No. 3, Sep. 2006, 19 pages.
Elmqvist et al., "Hierarchical Aggregation for Information Visualization: Overview, Techniques, and Design Guidelines," IEEE Transactions on Visualization and Computer Graphics 16(3), May 2010, 14 pages.
Fisher et al., "Exploratory Visualization Involving Incremental, Approximate Database Queries and Uncertainty," IEEE Computer Graphics and Applications, vol. 32, Issue 4, Jul./Aug. 2012, pp. 55-62, 8 pages.
Fisher Danyel, "Hotmap: Looking at Geographic Attention," IEEE Transactions on Visualization and Computer Graphics 13(6), Nov. 2007, 8 pages.
Franklin et al., "Continuous Analytics: Rethinking Query Processing in a Network-Effect World," CIDR, Jan. 4-7, 2009, Asilomar, CA, 6 pages.
Ganti et al., "Precomputing Search Features for Fast and Accurate Query Classification," WSDM '2010, Feb. 4-6, 2010, New York City, NY, 10 pages.
Hellerstein et al., "Online Aggregation", Proceedings of the 1997 ACM SIGMOD International Conference on Management of Data, ACM, New York, NY, 1997, pp. 171-182, 12 pages.
Jackson, Christopher H., "Displaying Uncertainty With Shading", The American Statistician, vol. 62, No. 4, Nov. 2008, 8 pages.
Jermaine et al., "The Sort-Merge-Shrink Join", ACM Transactions on Database Systems 31 (4), Dec. 2006, pp. 1382-1416, 35 pages.
Kampstra, Peter, "Beanplot: A Boxplot Alternative for Visual Comparison of Distributions", Journal of Statistical Software, Code Snippets, 28(1), Nov. 2008, pp. 1-9, 9 pages.
Kim et al., "Selecting the Best System: Theory and Methods", Proceedings of the 2003 Winter Simulation Conference, vol. 1, 2003, pp. 101-112, 12 pages.
Maurer et al., "Empirical Bernstein Bounds and Sample Variance Penalization", Proceedings of the Twenty-Second Annual Conference on Learning Theory, 7, 2009, 9 pages.
Olston et al., "Visualizing Data with Bounded Uncertainty", Proceedings of IEEE Symposium on Information Visualization, 2002, 8 pages.
Sanyal et al., "A User Study to Compare Four Uncertainty Visualization Methods for 1D and 2D Datasets", IEEE Transactions on Visualization and Computer Graphics, 15(6), Nov./Dec. 2009, pp. 1209-1218, 10 pages.
Slezak et al., "Towards Approximate SQL: Infobright's Approach", Proceedings of the 7th International Conference on Rough Sets and Current Trends in Computing (RSCTC'10), 2010, pp. 630-639, 10 pages.
Streit et al., "A Spreadsheet Approach to Facilitate Visualization of Uncertainty in Information", IEEE Transactions on Visualization and Computer Graphics, 14(1), Jan./Feb. 2008, pp. 61-72, 12 pages.
Wickham et al., "40 Years of Boxplots", Nov. 29, 2011, 17 pages.
Non-Final Office Action dated Jul. 9, 2015 from U.S. Appl. No. 13/723,224, 19 pages.
Response filed Sep. 21, 2015 to the Non-Final Office Action dated Jul. 9, 2015 from U.S. Appl. No. 13/723,224, 8 pages.

(56) References Cited

OTHER PUBLICATIONS

Non-Final Office Action dated Oct. 14, 2015 from U.S. Appl. No. 13/723,224, 45 pages.
Response filed Jan. 6, 2016 to the Non-Final Office Action dated Oct. 14, 2015 from U.S. Appl. No. 13/723,224, 11 pages.
Final Office Action dated Feb. 24, 2016 from U.S. Appl. No. 13/723,224, 25 pages.
Applicant-Initiated Interview Summary dated Apr. 25, 2016 from U.S. Appl. No. 13/723,224, 3 pages.
Response filed Apr. 29, 2016 to the Final Office Action dated Feb. 24, 2016 from U.S. Appl. No. 13/723,224, 9 pages.
Non-Final Office Action dated May 23, 2016 from U.S. Appl. No. 13/723,224, 15 pages.
Response filed Aug. 16, 2016 to the Non-Final Office Action dated May 23, 2016 from U.S. Appl. No. 13/723,224, 10 pages.
Final Office Action dated Sep. 16, 2016 from U.S. Appl. No. 13/723,224, 15 pages.
Response filed Nov. 10, 2016 to the Final Office Action dated Sep. 16, 2016 from U.S. Appl. No. 13/723,224, 10 pages.
Applicant-Initiated Interview Summary dated Nov. 15, 2016 from U.S. Appl. No. 13/723,224, 4 pages.
Notice of Allowance dated Nov. 23, 2016 from U.S. Appl. No. 13/723,224, 12 pages.
Voluntary Amendment filed Jul. 28, 2016 from Chinese Patent Application No. 201480033884.9, 15 pages.
International Preliminary Report on Patentability dated Feb. 19, 2015 for PCT Patent Application No. PCT/US2013/049820, 11 pages.
Notice of Allowance dated Jul. 29, 2016 from U.S. Appl. No. 13/439,650, 13 pages.
First Office Action dated Feb. 17, 2017 from Chinese Patent Application No. 21380037221.X, 13 pages.
Notice of Allowance dated Jan. 20, 2015 from U.S. Appl. No. 13/439,650, 9 pages.
"Daytona: Iterative MapReduce on Windows Azure," Retrieved on Sep. 19, 2013, at «http://research.microsoft.com/en-us/projects/daytona/», Microsoft Research, 4 pages.
Hadoop, "<<http://hadoop.apache.org/>>," Retrieved on Aug. 17, 2015, 3 pages.
"LINQ (Language-Integrated Query)", Retrieved on Feb. 22, 2013 at «http://msdn.microsoft.com/en-us/library/vstudio/bb397926.aspx», Microsoft, 1 page.
Microsoft Corporation; The LINQ Project, "LINQ (Language-Integrated Query)," Visual Studio 2010, Available at <<http://tinyurl.com/avs7wo>>, 2010, 26 pages.
Open Directory Project, <<http://dmoz.org>>, Retrieved date: Dec. 18, 2012, 1 page.
Abadi et al., "The Design of the Borealis Stream Processing Engine," Proceedings of the Second Biennial Conference on Innovative Data Systems Research (CIDR), Jan. 2005, 13 pages.
Agarwal et al., "BlinkDB: Queries with Bounded Errors and Bounded Response Times on Very Large Data," In EuroSys '13, Apr. 15-17, 2013, 14 pages.
Examination Report dated May 29, 2017 from European Patent Application No. 13740442.2, 9 pages.
Response filed Jul. 14, 2017 to the Examination Report dated May 29, 2017 from European Patent Application No. 13740442.2, 15 pages.
Second Office Action dated Oct. 27, 2017 from Chinese Patent Application No. 21380037721.X, 8 pages.
Khurana, et al., "A Framework for Fast Approximate Query Processing on Temporal Data", In Proceedings of the International Workshop on Big Data, Streams and Heterogeneous Source Mining, Aug. 24, 2014, pp. 29-45.
Kleiner, et al., "A General Bootstrap Performance Diagnostic", In Proceedings of the 19th ACM SIGKDD International Conference on Knowledge Discovery and Data Mining, Aug. 11, 2013, 9 Pages.
Chaudhuri, et al., "A Robust, Optimization-Based Approach for Approximate Answering of Aggregate Queries", In Proceedings of the ACM SIGMOD international conference on Management of data, May 21, 2001, pp. 295-306.
Wang, et al., "A Sample-and-Clean Framework for Fast and Accurate Query Processing on Dirty Data", In Proceedings of the ACM SIGMOD International Conference on Management of Data, Jun. 22, 2014, pp. 469-480.
Zeng, et al., "ABS: a System for Scalable Approximate Queries with Accuracy Guarantees", In Proceedings of ACM SIGMOD International Conference on Management of Data, Jun. 22, 2014, pp. 1067-1070.
Zhang, Donghui, "Advanced Database Aggregation Query Processing", In Workshop of EDBT Ph.D, 2002, 4 Pages.
"Airline Delays, Cancellations and Tarmac Times", Retrieved From https://web.archive.org/web/20140130232112/http://www.rita.dot.gov/bts/data_and_statistics/by_mode/airline_and_airports/airline_delay.html, Dec. 15, 2016, 2 Pages.
Inoue, Tomohiro, "An Effective Technique and Practical Utility for Approximate Query Processing", In the Thesis for Degree of computer Science, Curtin University, Nov. 2015, 95 pages.
Su, et al., "Approximate Aggregates in Oracle 12C", In Proceedings of the 25th ACM International Conference on Information and Knowledge Management, Oct. 24, 2016, pp. 1603-1612.
Vitter, et al., "Approximate Computation of Multidimensional Aggregates of Sparse Data Using Wavelets", In Proceedings of ACM SIGMOD International Conference on Management of Data, Jun. 1, 1999, pp. 193-204.
Koudas, et al., "Approximate NN queries on streams with Guaranteed Error/Performance Bounds", In Proceedings of Thirtieth international conference on Very large data bases, vol. 30, Aug. 31, 2004, pp. 804-815.
Liu, et al., "Approximate Query Processing", In Encyclopedia of Database Systems, Nov. 21, 2009, 9 Pages.
Garofalakis, et al., "Approximate query processing—Taming the terabytes", In Proceedings of 27th International Conference on Very Large Data Bases, Sep. 11, 2001, pp. 171-212.
Chakrabarti, et al., "Approximate Query Processing Using Wavelets", In International Journal on Very Large Data Bases, vol. 10, Issue 2-3, Sep. 2001, pp. 199-223.
Pezzotti, et al., "Approximated and User Steerable tSNE for Progressive Visual Analytics", In Journal of IEEE Transactions on Visualization and Computer Graphics, Dec. 2015, 15 Pages.
Vvongsuphasawat, et al., "Voyager: Exploratory Analysis via Faceted Browsing of Visualization Recommendations", In Journal of IEEE Transactions on Visualization and Computer Graphics, vol. 22, Issue 1, Jan. 2016, 10 Pages.
Agarwal, et al., "Automated Selection of Materialized Views and Indexes in SQL Databases", In Proceedings of the 6th International Conference on Very Large Data Bases, Sep. 10, 2000, pp. 496-505.
Goldstein, et al., "Big Data Analytics: Temporal Semantics, Frameworks, and Applications", In the Work Performed at Internship at Microsoft Research, 16 Pages.
Fisher, Danyel, "Big Data Exploration Requires Collaboration between Visualization and Data Infrastructures", In Proceedings of the Workshop on Human-In-the-Loop Data Analytics, Jun. 26, 2016, 5 Pages.
Wickham, Hadley, "Bin-Summarise Smooth: A Framework for Visualising Large Data", In Technical Report of Clarkson University, Oct. 13, 2013, 9 Pages.
Acharya, et al., "Congressional Samples for Approximate Answering of Group-by Queries", In Proceedings of the International Conference on Management of Data, May 16, 2000, pp. 487-498.
Bostock, et al., "D3: Data-Driven Documents", In Proceedings of the IEEE Transactions on Visualization and Computer Graphics, vol. 17, Issue 12, Dec. 2011, 9 Pages.
Potti, et al., "DAQ: a new paradigm for approximate query processing", In Proceedings of the VLDB Endowment, vol. 8, Issue 9, Aug. 31, 2015, pp. 898-909.
Gray, et al., "Data cube: A Relational Aggregation Operator Generalizing Group-by, Cross-tab and Sub-totals", In the Twelfth International Conference on Data Engineering, Feb. 26, 1996, pp. 152-159.
"Database SQL Tuning Guide", https://docs.oracle.com/database/121/TGSQL/tgsql_histo.htm#TGSQL366, Dec. 16, 2016, 22 Pages.

(56) References Cited

OTHER PUBLICATIONS

Joslyn, et al., "Decisions with Uncertainty: The Glass Half Full", In Journal of Current Directions in Psychological Science, vol. 22, Issue 4, Aug. 1, 2013, 3 Pages.
Kamat, et al., "Distributed and interactive cube exploration", In Proceedings of IEEE 30th International Conference on Data Engineering, Mar. 31, 2014, 12 Pages.
Babcock, et al., "Dynamic Sample Selection for Approximate Query Processing", In the International Conference on Management of Data, Jun. 9, 2003, pp. 539-550.
Tukey, John W., "Exploratory Data Analysis", In Publication of Pearson, Jan. 1977, pp. 5-23.
Acharya, et al., "Fast and Near-Optimal Algorithms for Approximating Distributions by Histograms", In Proceedings of the 34th ACM Symposium on Principles of Database Systems, May 31, 2015, pp. 249-263.
Bille, et al., "Fast evaluation of Union-intersection Expressions", In Proceedings of 18th International Symposium on Algorithms and Computation, Dec. 17, 2007, pp. 1-16.
Heer, et al., "Graphical Histories for Visualization: Supporting Analysis, Communication, and Evaluation", In Journal of IEEE Transactions on Visualization and Computer Graphics, vol. 14, Issue 6, Nov. 2008, 8 Pages.
Hullman, et al., "Hypothetical Outcome Plots Outperform Error Bars and Violin Plots for Inferences about Reliability of Variable Ordering", In PloS one, vol. 10, Issue 11, Nov. 16, 2015, 36 Pages.
Ganti, et al., "Icicles—Self-tuning Samples for Approximate Query Answering", In Proceedings of the 26th International Conference on Very Large Data Bases, Sep. 10, 2000, pp. 176-187.
Liu, et al., "imMens: Real-time Visual Querying of Big Data", In Publication of Wiley Online Library, Jun. 1, 2013, 4 Pages.
Cumming, et al., "Inference by Eye: Confidence Intervals and How to Read Pictures of Data", In Journal of American Psychologist, vol. 60, No. 2, Feb. 2005, pp. 170-180.
Budiu, et al., "Interacting with large distributed datasets using Sketch", In Proceedings of Eurographics Symposium on Parallel Graphics and Visualization, May 25, 2015, 13 Pages.
Olston, et al., "Interactive Analysis of Web-Scale Data", In Proceedings of 4th Biennial Conference on Innovative Data Systems Research, Jan. 4, 2009, 7 pages.
Godfrey, et al., "Interactive Visualization of Large Data Sets", In Proceedings of IEEE Transactions on Knowledge and Data Engineering, vol. 28, No. 8, Aug. 2016, pp. 2142-2157.
"International Search Report and Written Opinion Issued in PCT Application No. PCT/US2017/038407", dated Aug. 31, 2017, 15 Pages.
Stasko, et al., "Jigsaw: Supporting Investigative Analysis through Interactive Visualization", In Journal of Information Visualization, vol. 7, Issue 2, 2008, pp. 118-132.
Acharya, et al., "Join Synopses for Approximate Query Answering", In Proceedings of the ACM SIGMOD international conference on Management of data, Jun. 1, 1999, pp. 275-286.
Agarwal, et al., "Knowing when you're Wrong: Building Fast and Reliable Approximate Query Processing Systems", In Proceedings of the ACM SIGMOD International Conference on Management of Data, Jun. 22, 2014, pp. 481-492.
Perrot, et al., "Large Interactive Visualization of Density Functions on Big Data", In Proceedings of 5th IEEE Symposium on Large Data Analysis and Visualization, Nov. 17, 2015, 9 Pages.
"LINQ (Language-Integrated Query)", In Proceedings of the LINQ Project, Visual Studio, 2010, 26 Pages.
Lins, et al., "Nanocubes for Real-time Exploration of Spatiotemporal Datasets", In IEEE Transactions on Visualization and Computer Graphics, vol. 19, Issue 12, Dec. 2013, 10 Pages.
Gilbert, et al., "Optimal and approximate computation of summary statistics for range aggregates", In Symposium on Principles of Database Systems, May 21, 2001, pp. 227-236.
Chaudhuri, et al., "Optimized Stratified Sampling for Approximate Query Processing", In Journal of ACM Transactions on Database Systems, vol. 32, Issue 2, Jun. 1, 2007, pp. 1-58.
Yarygina, et al., "Optimizing Resource Allocation for Approximate Real-time Query Processing", In Proceedings of Computer Science and Information Systems, vol. 11, Issue 1, Jan. 2014, pp. 69-88.
"Oral Hearing Issued in European Patent Application No. 13740442.2", Mailed Date: Apr. 26, 2018, 8 Pages.
Jerzy Neyman, "Outline of a Theory of Statistical Estimation Based on the Classical Theory of Probability", In Publication of Royal Society, Aug. 30, 1937, 48 Pages.
Chaudhuri, et al., "Overcoming limitations of sampling for aggregation queries", In Proceedings of 17th International Conference on Data Engineering, Apr. 2, 2001, pp. 534-542.
Stolte, et al., "Polaris: A System for Query, Analysis, and Visualization of Multidimensional Relational Databases", In Proceedings of IEEE Transactions on Visualization and Computer Graphics, vol. 8, No. 1, Jan. 2002, 10 Pages.
Dobra, et al., "Processing Complex Aggregate Queries Over Data Streams", In Proceedings of the ACM SIGMOD International conference on Management of Data, Jun. 4, 2002, pp. 61-72.
Fekete, et al., "Progressive Analytics: A Computation Paradigm for Exploratory Data Analysis", In Proceedings of Computer Research Repository, Jul. 2016, 10 Pages.
Stolper, et al., "Progressive visual analytics: User-driven visual exploration of in-progress analytics", In Journal of IEEE transactions on visualization and computer graphics, vol. 20, Issue 12, Dec. 31, 2014, 10 Pages.
Kim, et al., "Rapid Sampling for Visualizations with Ordering Guarantees", In Proceedings of the VLDB Endowment, vol. 8, Issue 5, Aug. 31, 2015, pp. 521-532.
Shneiderman, "Response Time and Display Rate in Human Performance with Computers", In Journal of ACM Computing Surveys, vol. 16, Issue 3, Sep. 1984, pp. 265-285.
Nielsen, Jakob, "Response times: The 3 important Limits", In Book of Usability Engineering, Jan. 1, 1993, 7 Pages.
Ding, et al., "Sample+ Seek: Approximating Aggregates with Distribution Precision Guarantee", In Proceedings of the International Conference on Management of Data, Jun. 26, 2016, pp. 679-694.
Ferreira, et al., "Sample-oriented task-driven visualizations: Allowing users to make better, more confident decisions", In Proceedings of the SIGCHI Conference on Human Factors in Computing Systems, Apr. 26, 2014, pp. 571-580.
Sidirourgos, et al., "Sciborq: Scientific data management with bounds on runtime and quality", In Proceedings of 5th Biennial Conference on Innovative Data Systems Research, Jan. 9, 2011, pp. 296-301.
Olken, et al., "Simple Random Sampling from Relational Databases", In Proceedings of the Twelfth International Conference on Very Large Data Bases, Aug. 1986, pp. 160-169.
Zeng, et al. "The Analytical Bootstrap: A New Method for Fast Error Estimation in Approximate Query Processing", In Proceedings of ACM SIGMOD International Conference on Management of Data, Jun. 22, 2014, pp. 277-288.
Acharya, et al., "The Aqua Approximate Query Answering System", In Proceedings of the ACM SIGMOD International Conference on Management, Jun. 1, 1999, pp. 574-576.
Liu, et al., "The Effects of Interactive Latency on Exploratory Visual Analysis", In IEEE Transactions on Visualization and Computer Graphics, vol. 20, Issue 12, Dec. 2014, 10 Pages.
Pirolli, et al., "The Sensemaking Process and Leverage Points for Analyst Technology as Identified through Cognitive Task Analysis", In Proceedings of International Conference on Intelligence Analysis, vol. 5, May 2, 2005, 6 Pages.
North, Chris, "Toward Measuring Visualization Insight", In Journal of IEEE Computer Graphics and Applications, vol. 26, Issue 3, May 1, 2006, pp. 20-23.
Charikar, et al., "Towards Estimation Error Guarantees for Distinct Values", In Proceedings of the nineteenth ACM SIGMOD-SIGACT-SIGART symposium on Principles of database systems, May 1, 2000, pp. 268-279.
Moritz, D, et al., "Trust, but Verify: Optimistic Visualizations of Approximate Queries for Exploring Big Data", In Proceedings of the 2017 CHI Conference on Human Factors in Computing Systems, May 2, 2017, 12 Pages.

(56) References Cited

OTHER PUBLICATIONS

Yi, "Understanding and characterizing insights: how do people gain insights using information visualization?", In Proceedings of the Workshop on beyond time and errors: Novel Evaluation methods for Information Visualization, Apr. 5, 2008, 6 Pages.

"Third Office Action Issued in Chinese Patent Application No. 201380037221.X", dated Mar. 9, 2018, 7 Pages.

* cited by examiner

TABLE 200

| Row Number 201 | Day of Week 202 | Flight Number 203 | Airport 204 | Delay (minutes) 205 |
|---|---|---|---|---|
| 1 | Sun | 827 | BWI | 2 |
| 2 | Mon | 936 | Dulles | 14 |
| 3 | Fri | 7 | Sea-Tac | 7 |
| 4 | Thurs | 942 | Reagan | 106 |
| 5 | Tues | 118 | JFK | 48 |
| 6 | Wed | 936 | Dulles | 18 |
| ... | | | | |
| N | | | | |

510

Word Length Distribution

Fri May 25 15:29:20 PDT 2012

RD | var data = StreamAccess.GetDataStream();

520 data CepStream 0.0%

| rownumber | user | word |
|---|---|---|
| 11775 | 4a6ff944 | treatment |
| 11775 | 4a6ff944 | chinese |
| 11775 | 4a6ff944 | colored |
| 11775 | 4a6ff944 | purple |
| 11775 | 4a6ff944 | herbal |
| 11775 | 4a6ff944 | female |
| 11775 | 4a6ff944 | rare |
| 11519 | e876300c4 | http://447abc.com |
| 11263 | 24f4e06f | fabricator |

FIG. 10

PROGRESSIVE QUERY COMPUTATION USING STREAMING ARCHITECTURES

PRIORITY

This Utility application claims priority from U.S. Provisional Application No. 61/671,038, filed Jul. 12, 2012, the contents of which are hereby incorporated by reference in their entirety.

BACKGROUND

Existing techniques for working with data tend to provide a satisfactory user experience in most cases. For example, a user interacting with a database may use a graphical user interface (GUI) to issue various queries to a back-end database. In many scenarios, the queries can be executed in short periods of time and the user can continue working with the database interactively. This is also the case for many development scenarios, e.g., a software developer may write various queries, test them against the database, and receive results in an interactive fashion. This facilitates query development because the software developer can revise a given query as needed if the query does not produce expected results.

However, for large data sets, existing techniques do not always provide a satisfactory user experience. For example, "big data" tools such as Apache™ Hadoop® enable analysis of massive amounts of data, but not necessarily in an interactive fashion. In a big data context, a given query may take a very long time to complete, perhaps even overnight. From the perspective of the software developer responsible for writing the query, it can be difficult to debug such queries efficiently because the software developer waits a long time until the query completes before evaluating the results for correctness.

SUMMARY

The above listed example is intended to provide a quick reference to aid the reader and is not intended to define the scope of the concepts described herein.

This document relates to processing of electronic data. One implementation is manifest as a technique that can include obtaining a relational query that references one or more data items and associating progress intervals with the data items. The technique can also include converting the relational query into a corresponding streaming query, and providing the streaming query and the data items with progress intervals to a stream engine that produces incremental results of the query. At least the associating can be performed by a computing device.

Another implementation is manifest as one or more computer-readable storage media comprising instructions which, when executed by one or more processing devices, cause the one or more processing devices to perform acts. The acts can include processing a relational query using a stream engine configured to process streaming queries, and updating an interface with incremental results produced by the stream engine.

Another implementation is manifest as a system that can include logic and at least one processing device configured to execute the logic. The logic can be configured to receive a first code entry, receive a second code entry that relies on results of the first code entry, and provide a visualization of progressive results of the first code entry and the second code entry.

BRIEF DESCRIPTION OF THE DRAWINGS

The accompanying drawings illustrate implementations of the concepts conveyed in the present patent. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

FIGS. 5-15 show exemplary screenshots of graphical user interfaces that can be provided in accordance with some implementations.

DETAILED DESCRIPTION

Overview

This discussion relates to electronic data processing, and more particularly to using electronic data processing to perform incremental computations on data. For example, the disclosed implementations can provide meaningful results for a relational query by performing the query over a partial data set. To do so, the disclosed implementations can introduce a notion of progress in association with data sets that may not have any explicit temporal meaning or ordering. In this manner, a stream engine can be configured to provide incremental results of the relational query.

The disclosed implementations also can be used to provide meaningful partial results to the composition of multiple relational queries. For example, consider a data set that indicates that users have received 1 million impressions of a particular online advertisement in a given day. The data set may indicate that, during that same day, the advertisement received 10,000 clicks for a click-through rate of 1%. One approach to determine the click-through rate is to run, to completion, a first relational query that computes the number of impressions during the full day. Next, one can run, to completion, a second relational query that computes the number of clicks for the full day, and divide the results of the second query by the first query.

However, this approach can involve waiting for both relational queries to fully complete. The disclosed implementations can offer partial, incremental results for the click-through rate, e.g., after 10% progress through both queries, the user can be provided with an associated click-through rate for the 10% of the data that has been processed. As progress continues, the partial results can be updated until the computations are fully completed. Also note that the queries can progress at different rates, e.g., the first query may be 20% complete and the second query only 10% complete. In this case, the user can be provided with results for 10% of the data, and thus may have a meaningful understanding of the average click-through rate without having to wait for a total number of clicks and/or impressions to be computed.

Network System Example

Figure 1:
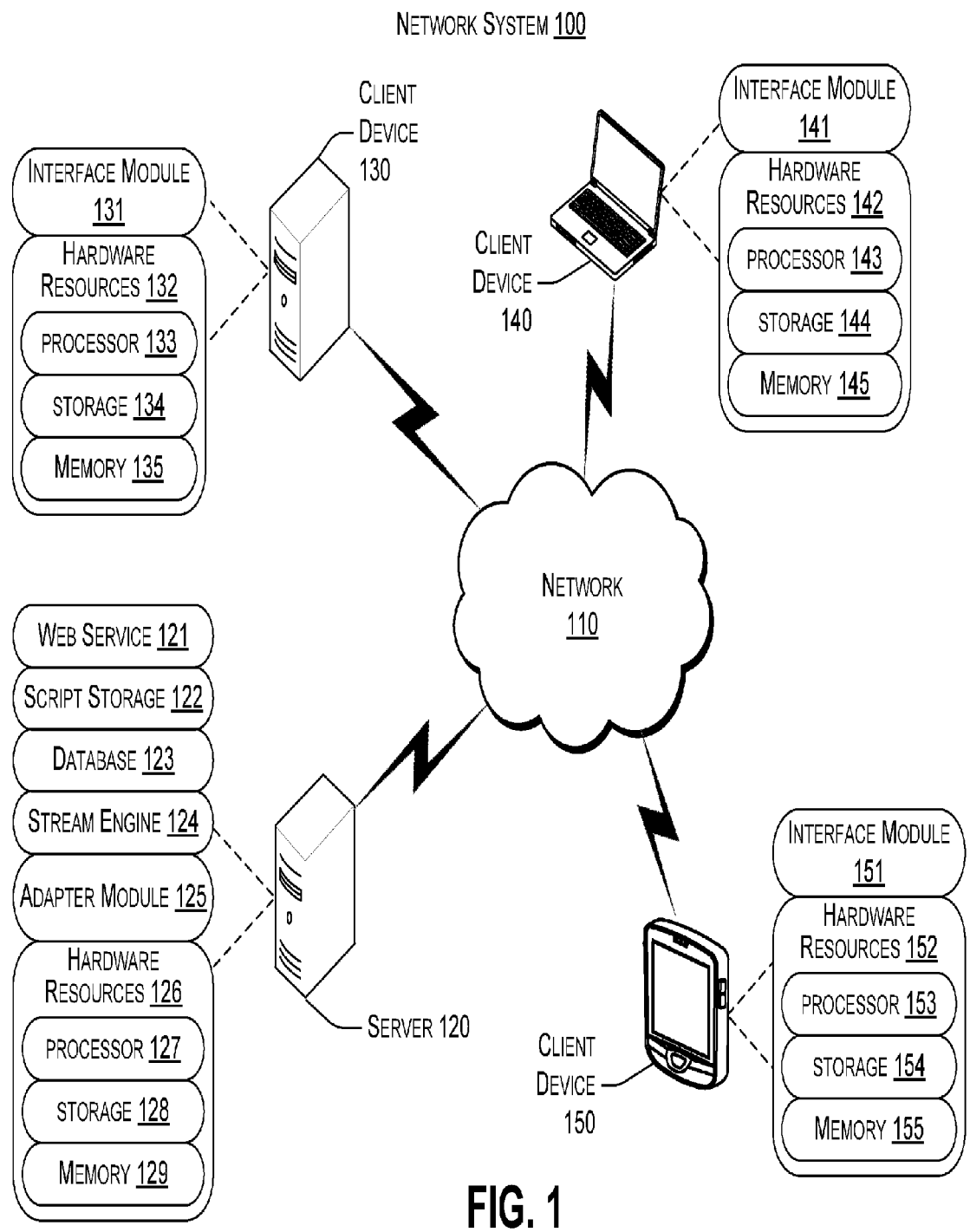
FIG. 1 shows an exemplary system that can be configured to accomplish certain concepts in accordance with some implementations.

FIG. 1 shows an exemplary network system 100 in which the techniques introduced herein can be employed. As shown in FIG. 1, network system 100 includes a network 110 connecting numerous devices, such as a server 120 and various client devices 130, 140, and 150. The server can have logical components including a web service 121, a script storage 122, a database 123, a stream engine 124, and an adapter module 125. The server may implement the logical components using hardware resources 126 such as a processor 127, storage 128, and memory 129. It is to be understood that the database 123 need not necessarily be on the same physical machine as Server 120; indeed, database 123 may consist of a distributed database architecture, such as a Hadoop® File System or Microsoft SQL Azure®, which consists of a network of databases. The client devices may have logical components such as interface modules 131, 141, and 151, and associated hardware resources 132-135, 142-145, and 152-155. Further details regarding hardware resources are provided later in this document. The immediately following discussion focuses on processing performed by the logical resources of the server and the client devices, e.g., components 121-125, 131, 141, and 151.

In some implementations, the interface modules 131-151 are web browsers that communicate with web service 121. For example, the interface modules can be HTML5 browsers that render commands and received updates and also send the commands to the web service. In other implementations, however, the interface modules can be dedicated or custom applications instead of web browsers. Further implementations may use browser plug-ins or other techniques to implement interface functionality described herein.

For example, users at the client devices 130-150 may submit source code, such as scripts, to the web service via the respective interface modules. The script storage 122 can be configured to store some or all of the received source code. Generally, the source code can be written to query the database 123, which can be a relational database (e.g., SQL) with data represented in tabular form. For example, the source code can be general-purpose code with integrated relational queries, or the source code can be directly written in a query language.

The stream engine 124 can be configured to perform processing on streaming data that is associated with explicit temporal data, e.g., data events with start times, end times, and/or durations. Notably, the data items in database 123 do not necessarily have any explicit temporal data or temporal ordering, and indeed can be randomly ordered. The adapter module 125 can be configured to adapt the data in the database so that the data can be processed by the stream engine. For example, the adapter module can obtain data items (e.g., rows of a table) from the database, create temporal data, associate the temporal data with the data items, and provide the data items to the stream engine as streaming events with the temporal data. The stream engine can then process the streaming events using one or more streaming query operators to produce incremental results.

Stream Engine Details

In a conventional database context, relational queries such as SQL queries can be used to build and manipulate tables for offline analysis. A contrasting approach is to use a stream engine that is designed for processing streaming events in real time. One example of a stream engine suitable for use with the disclosed implementations is Microsoft StreamInsight®, although other stream engines can also be used. Generally speaking, stream engines such as StreamInsight® are configured to receive streaming data events and continually output results that represent analysis of the data over a moving temporal window. For example, a stream engine can be configured to provide a moving average of the stock price for a given company over the past 5 days. As another example, a stream engine can be configured to compute an average temperature from a temperature sensor over a window of 5 minutes. Stream engines can thus implement streaming, continuous queries over changing data streams, in contrast to the static queries performed by a conventional database.

One differentiating feature between stream engines and conventional relational databases is that stream engines rely on a notion of temporality. This is because streaming events can be associated with explicit timestamps (example, the timestamp at which a particular activity occurred) and generally are valid for a given window of time, e.g., five days ago until present in the stock price example and 5 minutes ago until present in the temperature example. Thus, stream engines may rely on a notion of data "expiring" in the sense that the data is no longer valid for the query—data 6 days old or 6 minutes old in the previous examples is not considered by the stream engine when calculating current results. In contrast, a typical relational query may map query results to an entire data set, without any notion of progress or windows of validity of the data stored therein. Further, the data itself may be atemporal in nature, with tuples that are not necessarily associated with specific points in time.

Generally speaking, the adapter module 125 can introduce a notion of temporality into data for the purpose of processing a relational query using stream engine 124. For example, in the aforementioned click-through example, each group of 100 users in the data set may represent one processing interval. By treating the users as explicit progress points for the stream engine, the stream engine can be leveraged to provide partial, meaningful results to one or more relational queries. Some implementations may adapt data for processing by a stream engine by defining temporal windows of validity in association with each interval, as discussed more below. Note that with this formulation, the streaming engine may be unaware that it is being used to process an atemporal relational query.

Example Data

Figures 2A, 2B:
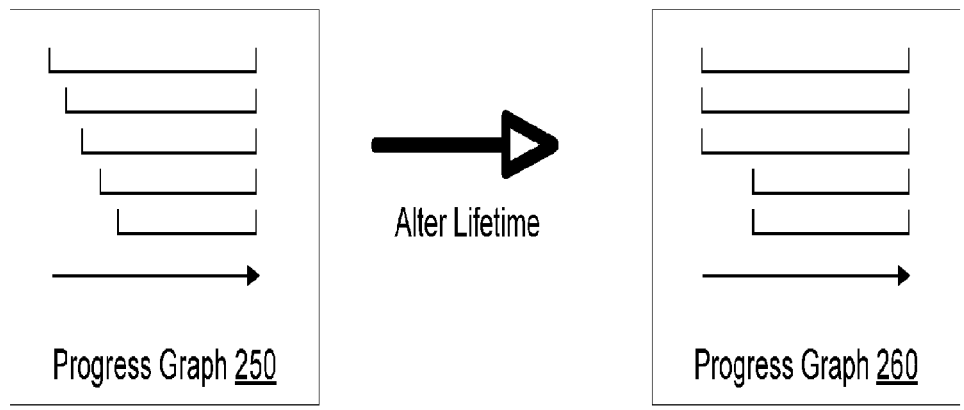
FIG. 2A shows an exemplary data table in accordance with some implementations.
FIG. 2B shows exemplary progress graphs that illustrate certain features that are consistent with some implementations of the present concepts.

FIG. 2A illustrates an exemplary relational data table 200 that can be employed in some implementations. Data table 200 includes N rows of data related to flight information, such as might be employed by an airline or travel service. Data table 200 includes a row number column 201, a day of week column 202, a flight number column 203, an airport column 204, and a delay column 205. Each row ID corresponds to a particular data item, in this case, a particular flight on a particular day. For example, table 200 shows that flight 936 was delayed 14 minutes in one instance (row 2) and 18 minutes in another instance (row 6). Note that the row number column may serve as a primary key in this example, e.g., to differentiate different instances of the same flight number. Also, note that there is no inherent temporal order to the data in the data table, i.e., the table does not specify that any of the delays happened before or after one another. Thus, the data items in the data table are not configured for processing by a conventional stream engine.

Now, consider a user that wishes to know the average flight delays for different days of the week. Further, assume that N is a very large number, perhaps in the millions or even greater. Using a conventional relational query, one approach to provide the user with an answer would be to build a query plan (e.g., tree) of operators such as SELECT, JOIN, etc. The query plan can read the entire data set of N rows and process them as a whole to produce an output that gives the requested average delays for each day of the week. This can take a substantial amount of time depending on the amount of data to be processed, available processing resources, etc.

Note, however, that it is unlikely that all of the data really needs to be processed before meaningful conclusions can be derived. For example, processing only 10,000 of the rows may provide statistically meaningful information on average flight delays for different days of the week. Using a conventional relational query, however, the user will need to wait for the entire data table 200 to be processed before being given a query result.

To provide meaningful intermediary results to such a query, a conventional stream engine can be used in some implementations. However, as mentioned above, conventional stream engines are generally configured to process data items with limited lifetime windows that are defined based on temporal values associated with the data items. In some implementations, the adapter module 125 may provide the row ID of a given data item to the stream engine 124 as a temporal attribute of each data item. Thus, from the perspective of the stream engine that is processing data table 200, row 1 begins at time 1, row 2 begins at time 2, row 3 begins at time 3, etc. The stream engine can increment a "tick" or time counter each time a given row is processed. In a sense, this amounts to reusing the notion of application time in a stream engine by setting the application to a progress time. Here, progress time represents progress through the data set towards a final state when all of the data items have been processed. Note, however, that row ID is just one example of a domain over which progress can be defined.

Furthermore, note that a conventional stream engine may process data items that have both a beginning and an end time, e.g., the windows of 5 days, 5 minutes, etc. In this case, however, the user wants an average over all of the data items and thus does not necessarily want individual rows to "expire." In other words, the user wants all of the data values in the table 200 to contribute to the final results. The adapter module 125 can accomplish this by creating a stream event for each data item in the data table and setting the end lifetimes of the stream events so that the events do not end, e.g., by setting the end times to infinity. In other words, the adapter module can create an input event to the stream engine that includes data from row 1, begins at time 1, and ends at time infinity. Likewise, the adapter module can create another input event to the stream engine that includes data from row 2, begins at time 2, and ends at time infinity. More generally, the adapter module can convert each row of the data table to an input event that starts at a time defined by the row number and ends at infinity. Note, however, that other time windows for the events are feasible depending on the specifics of the query, as discussed more below.

Thus, one approach that allows the application of streaming operators of a stream engine to conventional data is to define some progress attribute that can be used by the stream engine to process individual data items. In the example above, the progress attribute was row ID and the progress was explained on a row-by-row basis. Further implementations may define progress at different levels of granularity. For example, every 3 rows of data in table 200 can be considered a progress point.

This is illustrated at FIG. 2B, which shows a progress graph 250 that represents progress on a row-by-row basis and a progress graph 260 that shows progress based on progress intervals whose left endpoints move forward every 3 rows. In this example, the stream engine 124 can process rows in groups of 3 and output a new set of results for each group. In other words, the first set of results produced by the stream engine would represent the average flight delays for the first 3 records, the second set of results produced by the stream engine would represent the average flight delays for the first 6 records, the third set of results would represent the average flight delays for the first 9 records, and so on. Note also that the value 3 was chosen to provide for compact illustration in FIG. 2B, and many different values can be used, e.g., progress can be defined on an arbitrary number of records.

From a conceptual perspective, each progress interval represents a "snapshot" of time from the perspective of the stream engine. The stream engine can execute streaming operations such as selects, projects, joins, etc., using streaming counterpart operations to traditional relational queries. Each streaming operation can operate on an individual snapshot of data at a single time.

To configure the input events, the adapter module 125 can use an AlterLifetime operation of the stream engine. In this case, parameters of the AlterLifetime operation can be used to (1) set the start timestamp for each event and (2) set the duration for each event. In the example above, the first 3 events (for the first 3 data items) could be set with a start time of 1 and a lifetime of infinity, the next 3 events with a start time of 2 and a lifetime of infinity, the next 3 with a start time of 3 and a lifetime of infinity, and so on. From this perspective, rows 1-3 contribute to the results from time 1 through infinity, rows 4-6 contribute to the results from time 2 to infinity, etc. Some implementations can also define lifetimes at different granularities as rows are processed. For example, results can be provided every 100 records for the first 10,000 records to give the user relatively quick feedback, and thereafter records can be processed in sets of 1,000. Each individual event in a given set of events can have the same lifetime and contribute to the results from the beginning of their lifetime.

Thus, in the current example, a streaming SELECT operation to obtain delay times for Mondays can operate on a first set of events for the first three rows at the first snapshot, a second set of events for the first 6 rows at the second snapshot, and so on, as well as for the other days of the week. Averages can be computed on individual snapshots in a like manner. In this fashion, the original relational query is progressively performed on larger and larger sets of data until all the data has been processed and a final state has been reached. At this point, the final results output by the stream engine can be identical to those that would be output by a conventional relational database. In other words, once the stream engine time ticks to the end time of the events, the entire data set contributes to the answer as in a conventional SQL query.

Thus, the streaming operations implemented by the stream engine can be viewed as progressing through a series of progress points. The progress points can be viewed as a monotonically increasing ordered domain. Note that the above discussion refers to "infinity" as an example end lifetime of certain rows. In this context, "infinity" means the final progress point of the stream engine for a given data set. Thus, a data item with an end lifetime of infinity is a data item that contributes to the final result.

In some implementations, the web service 121 may obtain incremental results of the computations from the stream engine 124 and send the incremental results to any of the client devices 130-150 for display by the respective interface modules 131-151. Further implementations may process additional queries that depend on the results of previous queries that are currently progressing. For example, a first query may produce results that are used as an input to a second query. The first query can proceed up to a first progress interval, and the second query can begin processing using partial results of the first query up to the first progress interval. In this fashion, a pipeline of incremental results can be fed from one query to another. In turn, users at the client devices can be provided with visualizations of the incremental results for multiple dependent queries, as discussed in more detail below.

Query Progress

The disclosed implementations can be performed in view of the insight that temporal semantics of a stream engine can correspond directly to the notion of progressive computations for relational queries. As mentioned above, this can be implemented by using the application time notion of the stream engine to denote progress. This is possible because the semantics of progressive results are analogous to the semantics that a stream engine uses with time in order to compute streaming query results over real-time data streams.

Considered more formally, each individual tuple (e.g., row) is associated with a progress interval [LE, RE). Here LE refers to the left endpoint of the interval, whereas RE refers to the right endpoint of the interval. These intervals split the progress domain into distinct snapshots, where a result can be obtained at each snapshot. The union of these endpoints forms the set of "progress points" of the input to a stream engine.

The progress points can be used to define progressive output for a query Q as follows. First, each input tuple can have an assigned progress interval. Next, for every unique progress point p across all progress interval endpoints in the input data, there exists a set $O_p$ of output results with progress intervals that are "stabbed" by p. Here, the term "stabbed" implies that the progress point p includes all of the progress intervals that contain progress point p within the interval, e.g., for an interval [LE, RE) then p lies within LE and RE. The output of the streaming query $O_p$ can be defined to be exactly the result of the query Q evaluated over input tuples with progress intervals that are stabbed by p.

Given an ordered list of progress points $p_0, p_1, \ldots$ and so on, the progressive (or incremental) result of the input relational query as of progress point $p_i$ is the result of the streaming query on the data that is associated with (or is "live" at) $p_i$. The progressive result of progress point $p_i$ can be computed incrementally from the computation and/or result associated with the previously computed progress point $p_{i-1}$. Each progressive result tuple is itself associated with a progress interval so that progressive queries can be composed across operators.

Example Method

Figure 3:
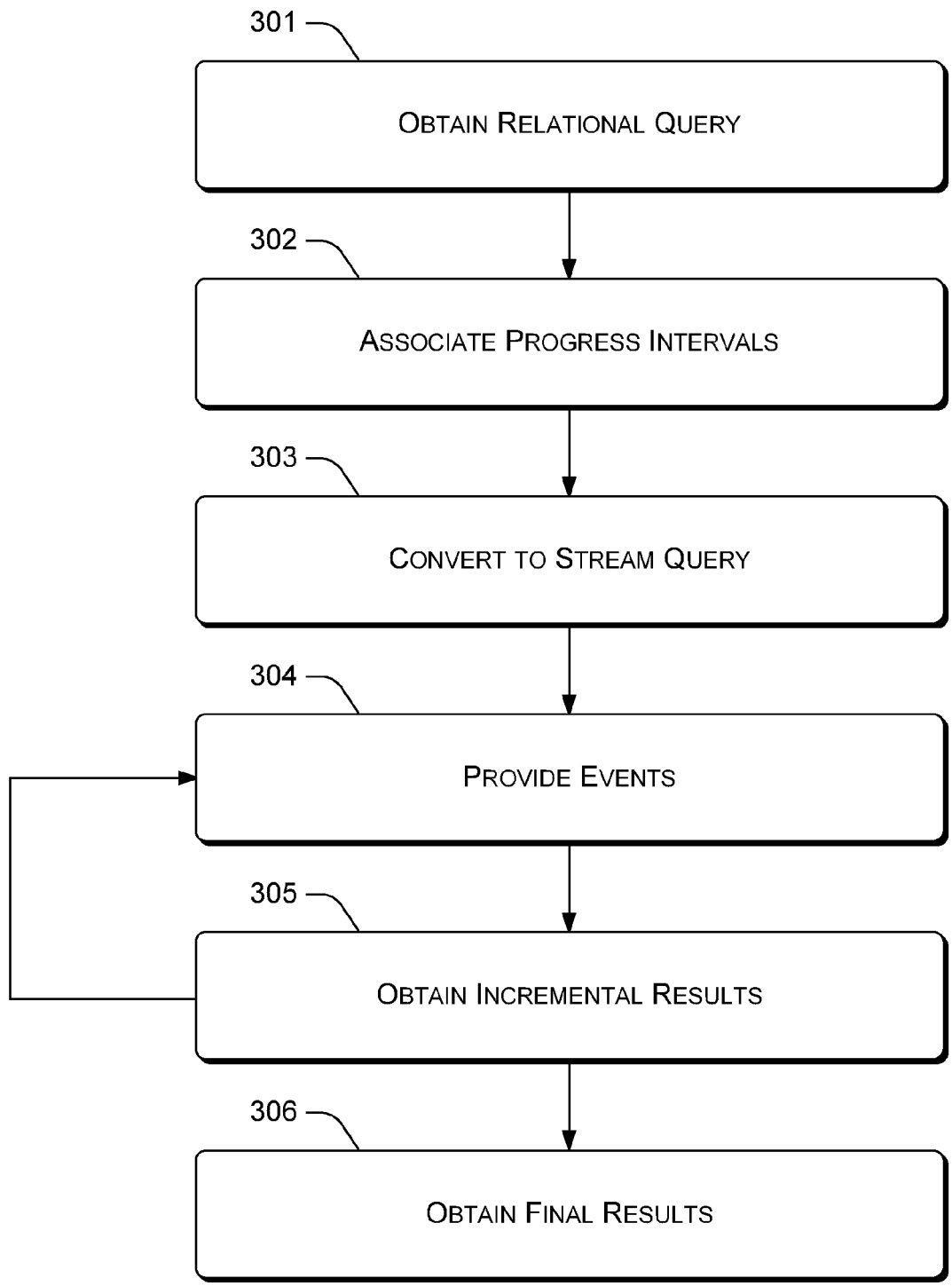
FIGS. 3 and 4 show flowcharts for accomplishing certain concepts in accordance with some implementations.

FIG. 3 shows an example method 300 that can be applied to adapt relational queries for use by a stream engine. For example, method 300 can be performed by the adapter module 125. However, some or all of the functionality described herein with respect to the adapter module can be performed by different modules or devices, e.g., by modifying stream engine 124, by performing processing at the client devices, etc.

At block 301, a relational query is obtained. For example, the adapter module may receive a relational query over the network. As another example, the adapter module can receive script code that identifies the relational query. In either case, the source of the relational query can be a user entering source code into the interface module 131.

At block 302, progress intervals are associated with data items that are referenced by the relational query. For example, each row ID of a table can be assigned a different progress interval, or multiple rows of a table can be grouped into sets where each set has an assigned progress interval.

At block 303, the relational query is converted into a corresponding streaming query. For example, the relational query can be a SQL query and the stream engine can implement streaming versions of the SQL query.

At block 304, events are provided to a stream engine. For example, an event can be generated for each row of the table and the time intervals of the events can be set to the progress intervals that were associated with the rows at block 302.

At block 305, incremental results can be obtained from the stream engine. For example, the adapter module can obtain the results and, as they are obtained, provide them to the user by sending them over the network to one or more of the client devices.

Generally, blocks 304 and 305 can continue iterating until the entire table has been processed. Then, at block 306, final results can be obtained from the stream engine and provided to the client devices as discussed above.

Queries on multiple tables can be performed as described above. For example, each table can have its own set of progress intervals, such that progress intervals are compatible across tables and indicate similar notions of underlying progress. For example, a click table and impression table may have tuples that are assigned the same progress intervals for identical sets of users actions that resulted in the clicks and impressions. The assignment of progress intervals gives end users (or automated progress assignment modules between the user and the system) significant flexibility in defining what progress means to their specific application.

Furthermore, using the disclosed techniques, it is possible to provide deterministic behavior. In other words, because explicit progress intervals are associated with individual data items in the table, there is one particular progressive result associated with any given progress point for a particular data set. Likewise, this provides precise data-dependent query semantics for the progressive results, because changing the input data has a specific effect on the progressive results that can be recomputed for any given progress point.

In addition, the disclosed implementations provide a provenance quality for progressive results. For any given progressive result, the adapter module 125 can be configured to determine the set of data items that were used to compute the progressive result. The stream engine can do so by determining the progress interval for a given progressive result. This is possible because each progress interval corresponds to an identifiable (e.g., unique) set of data items.

In some implementations, the adapter module 125 can be configured to identify, for any given result, the particular data items that contributed to that progressive result and provide them to the user. For example, a user debugging a given query can be provided with all of the data items that contribute to the first progress interval for a given query. This enables the user to check the correctness of the query using alternative mechanisms such as computing expected results of the query manually.

Query Pipelines

Method 300 can be used to pipeline partial, incremental query results from one query to another. For example, incremental results output at block 305 for a first query can be input to a second query. Thus, incremental results can be obtained for the second query as well.

Figure 4:
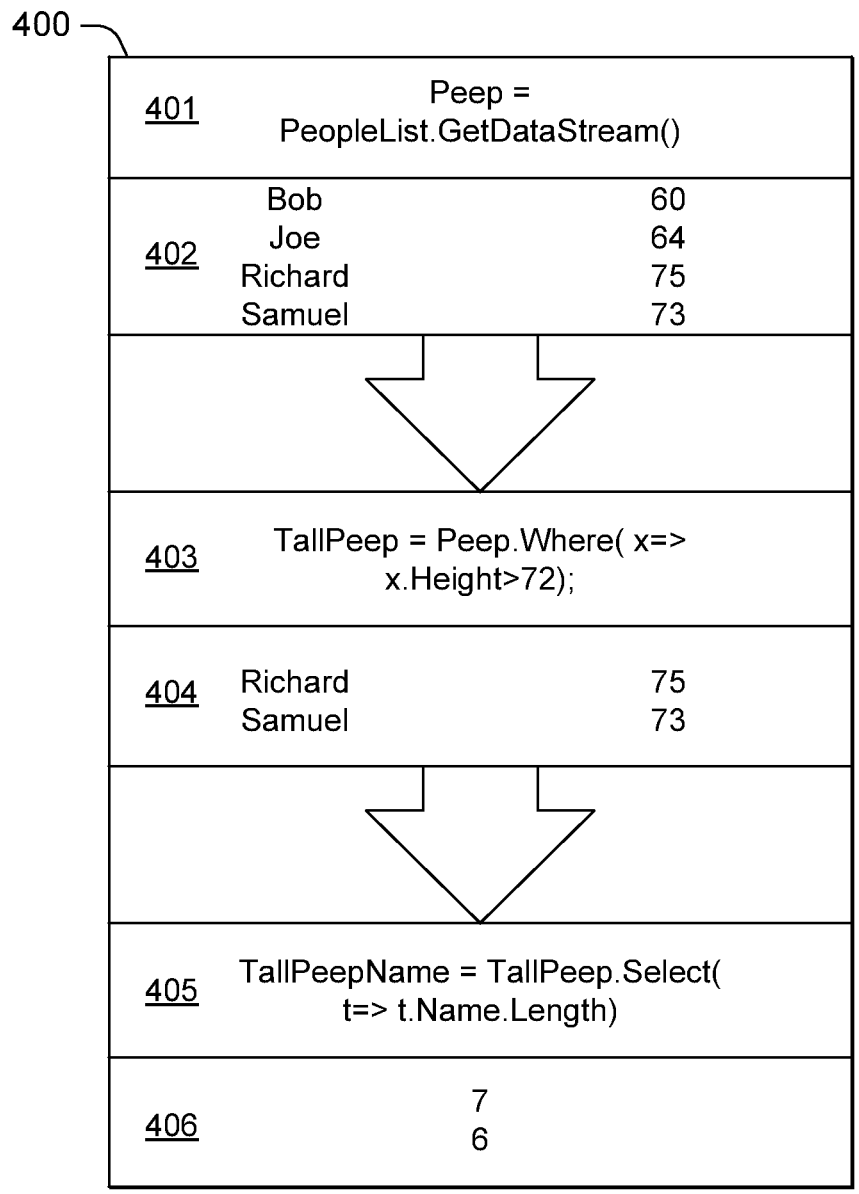

FIG. 4 illustrates a flow chart of an exemplary query pipeline 400. First, a user enters a first code entry 401. Code entry 401 can be source code that is used to derive a relational query that is subsequently converted to a streaming query. Incremental results 402 of the streaming query are output by the stream engine 124. Here, progressive results 402 represent heights of individuals named Bob, Joe, Richard, and Samuel, with heights of 60, 64, 75, and 73 inches, respectively.

Next, the user provides a second code entry 403. Code entry 403 is used to derive a second relational query that is subsequently converted to a second streaming query. Second incremental results 404 of the second streaming query are output by the stream engine 124. Here, the second incremental results 404 represent heights of individuals over 72 inches, which include Richard and Samuel.

Next, the user provides a third code entry 405. Code entry 405 is used to derive a third relational query that is subsequently converted to a third streaming query. Third incremental results 406 are output by the stream engine. Here, the third progressive results represent name lengths of individuals over 72 inches tall, e.g., 7 and 6 for Richard and Samuel, respectively.

One consequence of pipelining query results in this fashion is that the user can receive feedback from a first query and then decide what code to enter based on the feedback. This ongoing feedback can be received as long-running computations continue to progress. Furthermore, users can stop computations before they complete, e.g., if the results appear to indicate some logical error in the code.

Memory Overhead

Stream engine 124 may be configured to operate entirely in main memory and produce incremental results to streaming queries. For each incoming event, the stream engine can check if the query result needs to be updated as a result of the event, and if yes, can produce an output event immediately. In order to accomplish this, the continuous queries can be compiled into a graph of incremental operators that process incoming events in a push-based manner, i.e., for every incoming event, they update some internal in-memory state and produce output events that reflect the change to the operator result as a result of processing that data. As mentioned, stream engines are generally configured to operate over bounded temporal windows of data. Thus, the stream engine can clean up internal state when it is no longer needed, e.g., the stream engine can clean up input events and intermediate results that will no longer contribute to new results.

A consequence of using an in-memory stream engine to process data without enforcing bounded windows (e.g., end time of infinity) is that internal state may need to be maintained. For example, in the case of a join, the last data item in a left side input table may join with the first item on the right side input table. As a result, memory usage can monotonically increase over the lifetime of the streaming query. However, note that some interactive streaming queries do not necessarily run to completion and thus memory usage is not necessarily an issue in practice.

Some streaming queries may have characteristics that allow memory overhead to be reduced substantially. For example, consider the case where the progress attribute is the same as (or correlated with) the partitioning attribute. A query may be computing the average click-through-rate per user in a log of ad clicks and impressions. Assume that each row of the log is used as an event, the progress attribute uses rows of the log, and users appear in multiple rows that are scattered throughout the table. Since the stream engine 124 can encounter a given user at any row in the table, then the stream engine maintains a counter for every user in the table until a final state is reached.

However, consider the case where progress can be performed on a per-user basis. For example, the records for each user can be grouped together in the table. In this case, when the stream engine progresses to the next user, the stream engine 124 will no longer see any events for the previous user(s). Thus, the stream engine can clean up counters for previously-processed users by deleting them from memory. The stream engine can persist the click-through rate for that user (an incremental result) in storage and/or by sending the incremental results to one or more client devices.

In some implementations, the adapter module 125 can cause the stream engine 124 to perform cleanup by putting an AlterLifetime before the query is executed. The Alter-Lifetime call can change the progress endpoint of each user to be one chronon (or "tick") in duration, so that the events representing the users expire instead of lasting for "infinity." Thus, when the stream engine moves to the next user, the stream engine can automatically forget the state associated with the previous user.

Using the above technique can reduce memory utilization of the stream engine 124, but without more, the stream engine may delete results as well as intermediate states. Thus, the adapter module 125 can also configure the stream engine to retain results while still cleaning up intermediate state. To do so, the adapter module can perform another AlterLifetime call to set the progress endpoint back to the original value of the lifetime before the first AlterLifetime was performed, e.g., infinity or another value sufficient to persist the results until they are no longer needed. This technique can be done automatically using properties that indicate the connection between progress and partitioning.

As a short example, consider a data table with 6 entries indicating which animals given users have on a farm. The table can include 6 records as follows: {(Steve, Horse), (Steve, Cow), (Steve, Dog), (Bob, Chicken), (Bob, Pig), (Joe, Donkey)}. Now, consider a query on this table to count the number of different animals on each farm. The lifetimes of the input events can be set so that the records for Steve begin at 0 and end at 1, Bob's records begin at 1 and end at 2, and Joe's records begin at 2 and end at 3. Lifetimes for the results for the query that counts the number of records (e.g., output events) are persisted until the entire table is processed, e.g., by setting the lifetimes of the results to end at infinity. In this example, the user identifiers are used as a progress attribute instead of using the row numbers. This works semantically in this context because the query is aggregating information on a user-by-user basis.

The above technique can leverage physical storage locations of records on a storage device. For example, in a table ordered by user id, the physical location of the individual records on the storage device may correspond to the order in which the records will be processed by the stream engine. Thus, some implementations allow the individual records to be read from storage in the order they physically appear in storage.

Example Graphical Interfaces

The code entries mentioned above can be provided to the adapter module 125 and/or stream engine 124 by various local and/or remote user interfaces. Likewise, incremental results can be output using different remote and/or local user interfaces. The following discussion illustrates some exemplary graphical interfaces that can be used in conjunction with the adapter module and stream engine. However, note that the following interfaces are suitable for use with techniques for obtaining incremental query results other than those discussed herein. Generally, the graphical interfaces discussed below can be provided by web service 121 to the client devices 130-150, and displayed by the corresponding interface modules 131-151.

Figure 5:
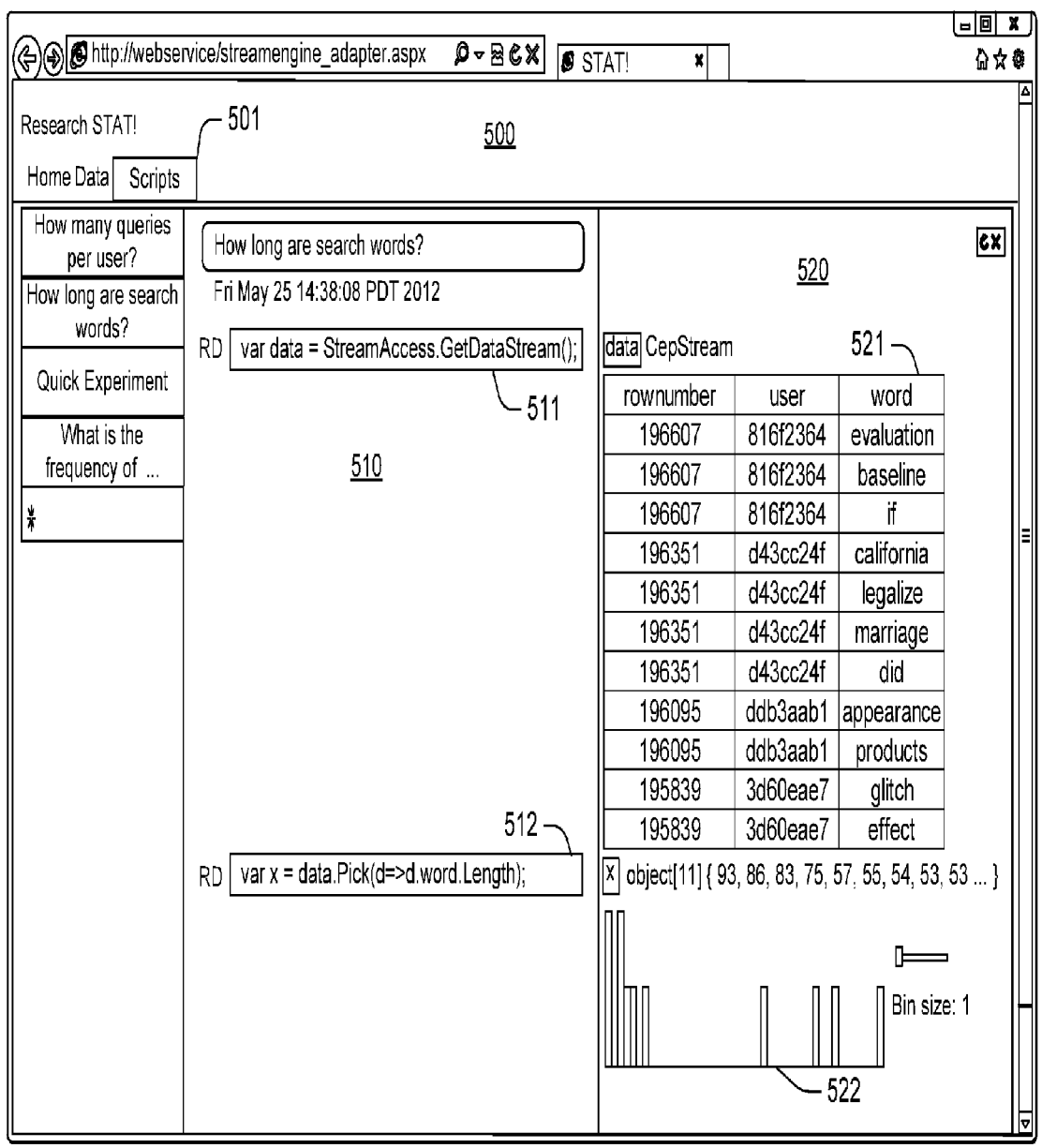

FIG. 5 illustrates an exemplary graphical user interface (GUI) 500. GUI 500 includes a scripts tab 501 that allows a user to see various existing scripts that are saved on server 120 in script storage 122. Here, the user has selected a script entitled "How long are search words?" Responsive to the user selection, GUI 500 is updated to show previously-entered script code in code section 510 and previously-obtained results in results section 520. For example, the previous code and results can relate to a previous scripting session and can be obtained from script storage 122.

Code section 510 includes 2 individual code entries 511 and 512, and corresponding results in results section 520. Thus, the 2 code entries collectively comprise the script "How long are search words?" and the associated results collectively comprise results of the script. Here, the results include a table that represents the latest 10 values of the variable "data". As line 511 progresses, result table 521 will be repeatedly updated with a new ten values. The results of script entry 512 include a histogram showing word lengths of the words. Result histogram 522 will be updated incrementally as the query continues on. Generally speaking, GUI 500 gives the user the ability to enter code, receive incremental results, save the code and associated results, and retrieve them later.

Thus, in some implementations, code and/or associated results and visualizations are automatically persisted after a given scripting session. This allows users to reenter the scripting session as of a previous state. Each scripting action, such as creating, deleting, or editing a script, can be stored in the script storage 122. When a user accesses the web service 121, the user may see their available scripts and script contents up to the last recorded change.

The web service 121 can also store summaries of the results of each of the code entries as the results are computed. This means that the results of a given code entry can outlast the scripting session itself. In some implementations, the GUI 500 uses a different background to distinguish scripts where there is an ongoing session ("live" scripts) from those whose scripting session previously ended ("dead" scripts). A refresh button or other interface element can be provided to revive dead scripts. Some implementations may time out script sessions after a given period of inactivity, e.g., 20 minutes.

Because users have the ability to overwrite and delete code entries and the results of overwritten/deleted code entries are persisted, some issues can arise. For example, consider a user that enters:

int x=3;
x=x+1;

and then deletes the second line of code in the GUI and replaces it as follows:

int x=3;
int y=x;

After the user clicks enter, the second line is evaluated and the variable x is updated to equal 4. When the user deletes the increment operation on x, some implementations do not necessarily undo its effects in the corresponding scripting session. Note, however, that the user can hit the refresh button to re-run both code entries and give y the expected value of 3. Some implementations may maintain data dependencies needed to visually distinguish results whose values would be different if the refresh button were hit. For example, data items that would change on a refresh operation can be highlighted or otherwise distinguished from other data values.

As a consequence of storing scripts in a central database and hosting scripting sessions on a central server, multiple people can work concurrently on the same scripting session from different client devices. The web service can asynchronously contact each client device about changes to the database to keep each user's view up to date. As mentioned previously, each scripting action can be tagged, by the web service, with the user ID of the person who took the action. For example, in FIG. 5, to the left of each command are the initials of the person who last edited that command (RD). This allows the user viewing the interface to understand what her teammates are up to and to share their results as they work. Other teammates may choose to copy a script to a new page to explore other queries.

Further implementations may provide for the peer-to-peer and master/apprentice styles of collaboration. In such implementations, the functionality discussed with respect to the server 120 herein can be performed by a single peer or distributed across multiple peers. Some scripts may be provided as multimedia documents, including formatted natural language text, images, audio annotations, and sticky-note annotations. Further implementations can provide export paths so that visualizations in the scripting environment can be readily saved in alternative formats. For example, some implementations may produce .jpg images, .pdf files, PowerPoint® slides, etc., directly from the GUI 500.

First Example Script and Results

Figure 6:
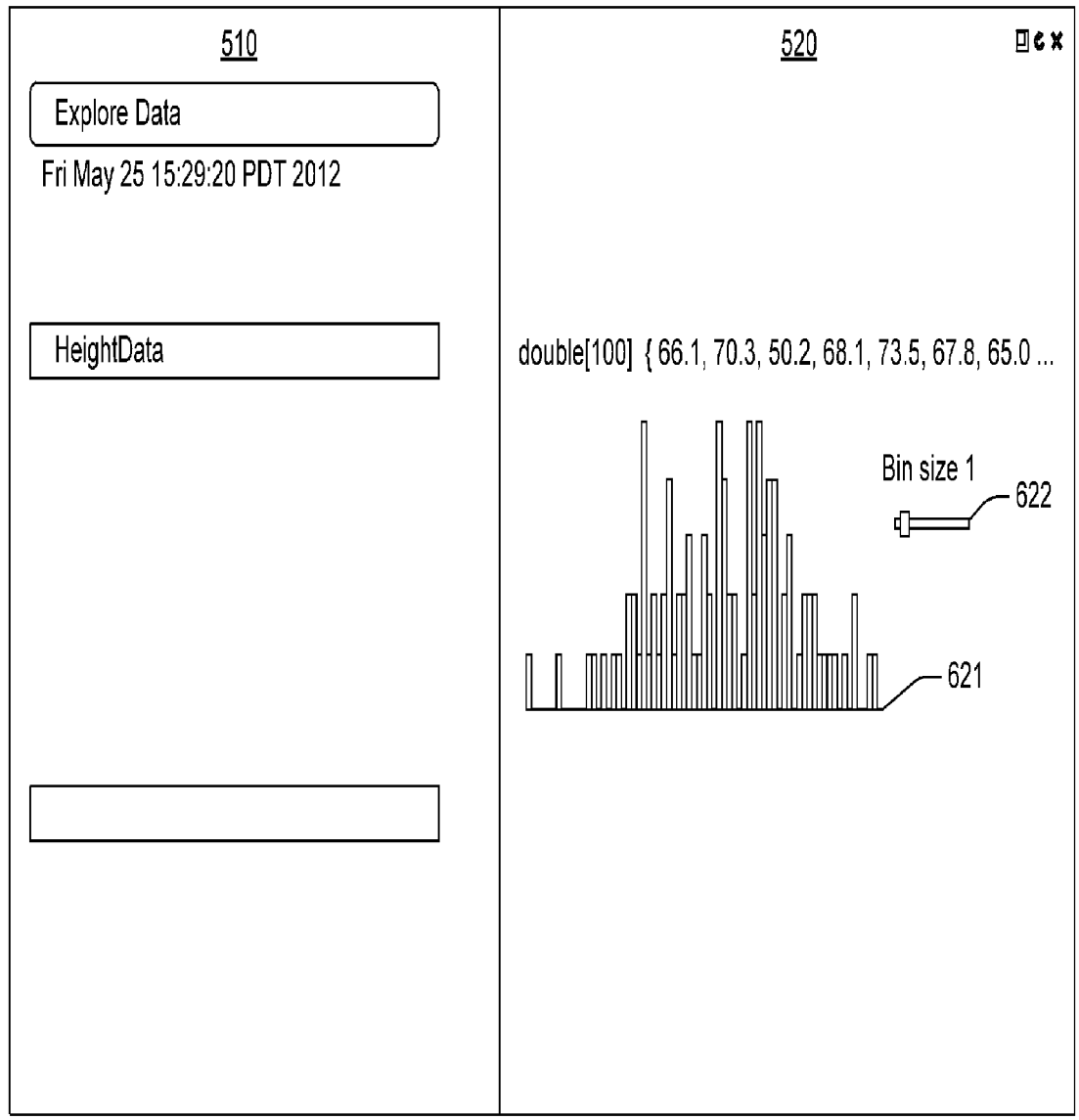

FIG. 6 illustrates code section 510 and results section 520 of GUI 500 in another configuration where the user is processing height data in a script entitled "Explore Data." Other portions of GUI 500 are omitted from FIG. 6 due to space constraints. As mentioned, users can enter code into code section 510, e.g., here the user has entered "HeightData" which refers to a variable defined in the scripting environment. For example, HeightData may have been defined in a previously-executed line of code that is no longer shown, or otherwise defined as a data source. HeightData may be an array of doubles representing various heights of people, and can be obtained from various data sources such as a relational data table. Here, once the user enters "HeightData," the scripting interface is automatically populated with a visualization such as histogram 621. Thus, simply by clicking "enter" after typing HeightData, the user is immediately presented with the histogram. This can relieve the user of the burden of actively requesting visualizations and instead promote interactivity of the user experience. A histogram is merely for example; other visualizations that represent aggregate information may also be provided.

Figure 7:
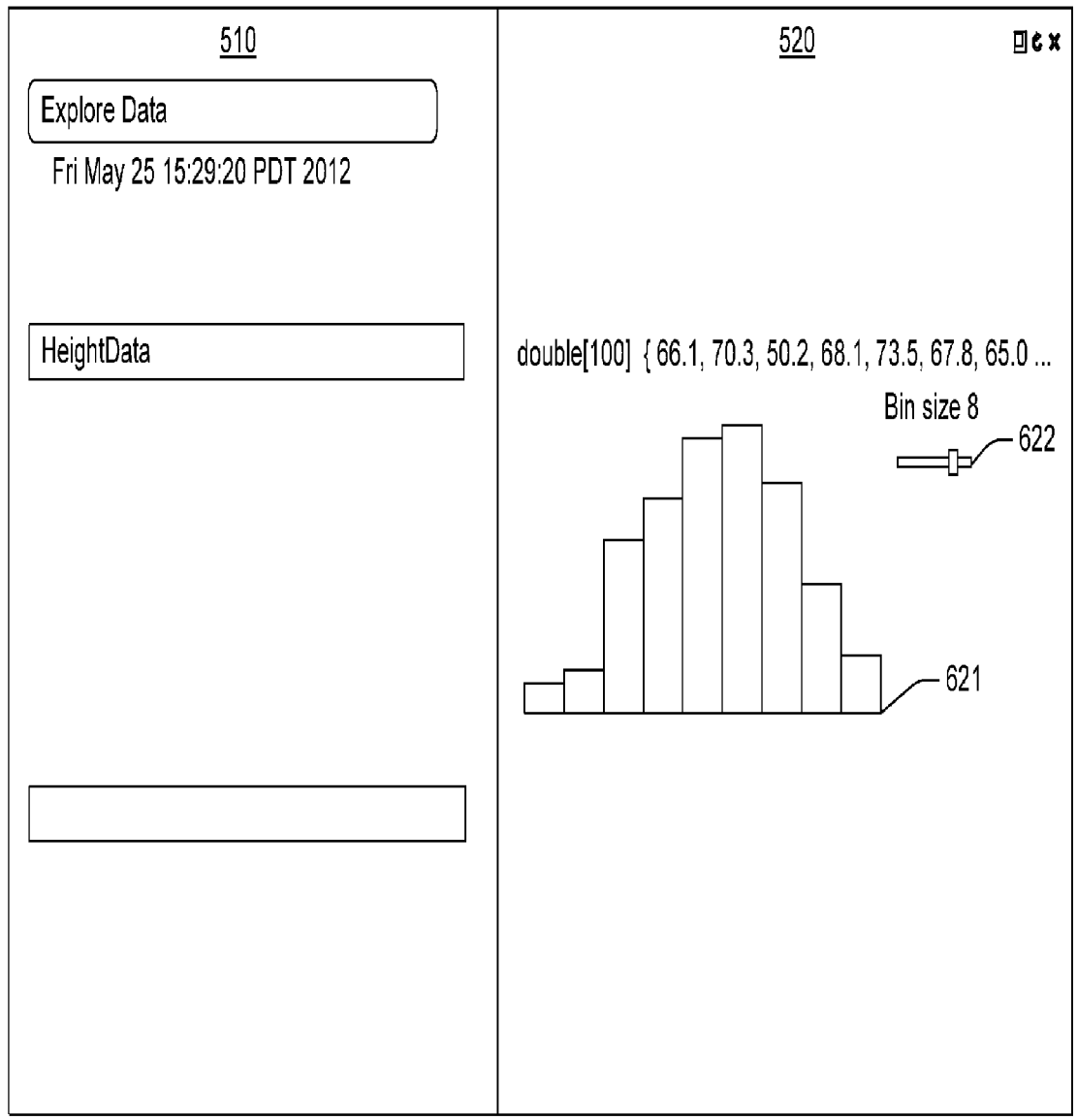

Histogram 621 can include a bin size slider 622. By adjusting the bin size, the user can see how the data groups at different levels of granularity. Considering FIG. 6 with a bin size of 1, each bar in the histogram represents an individual data item. By moving the slider to change the bin size to 8, the histogram can be updated so that 8 individual data items fall in each bin, as shown in FIG. 7. Note that by changing the bin size, the data begins to more clearly resemble a typical distribution than was the case when the bin size was 1.

Figure 8:
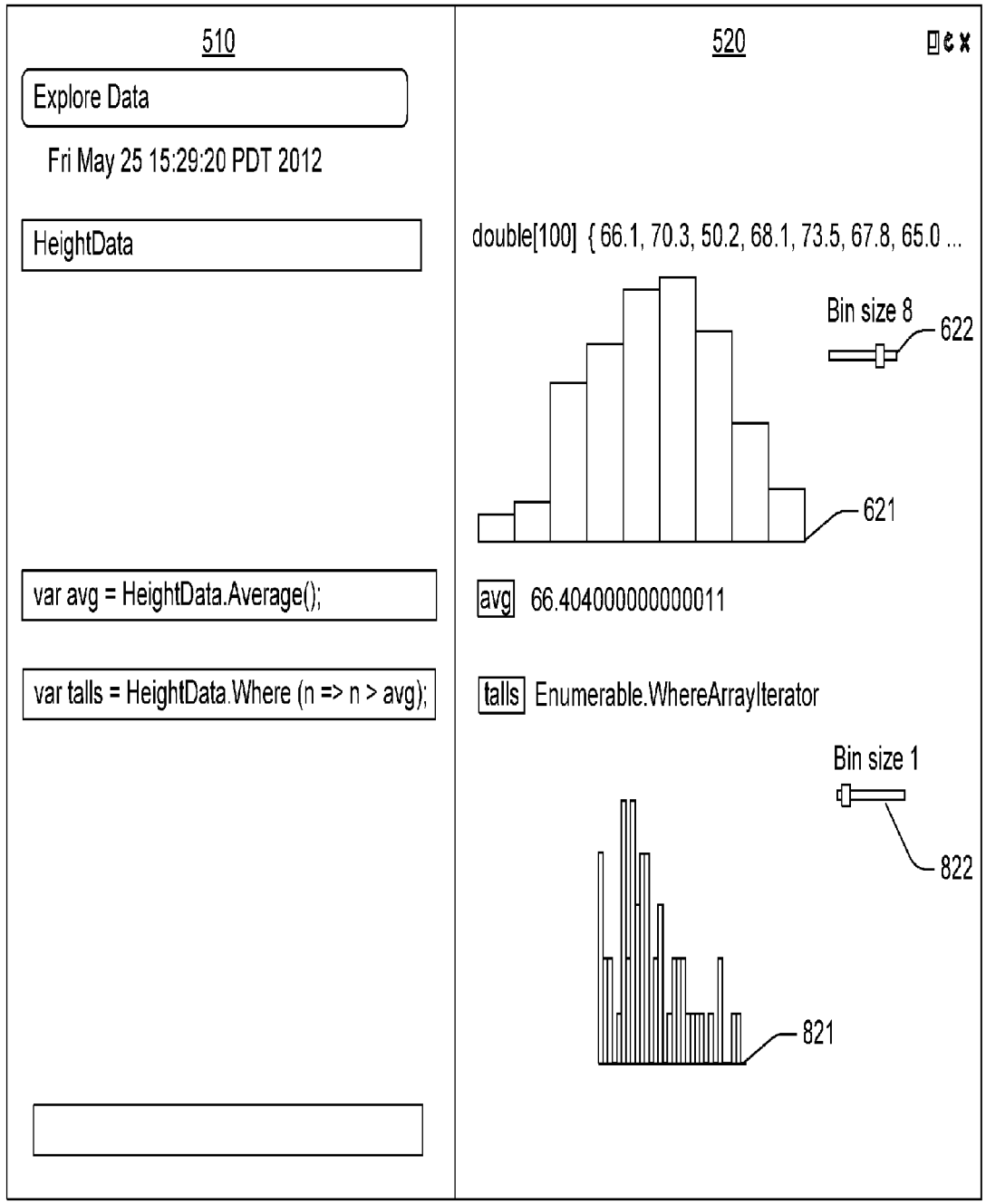

FIG. 8 shows code section 510 and results section 520 in a configuration where the user has entered two more lines of code. First, the user populates a value "avg" with a scalar value for the average of the height data. In this case, the scalar value is displayed in a decimal representation in the results section 520, e.g., approximately 66.4. More generally, decimal representations or other numeric formats may be used to display scalar values in results section 520.

Figure 9:
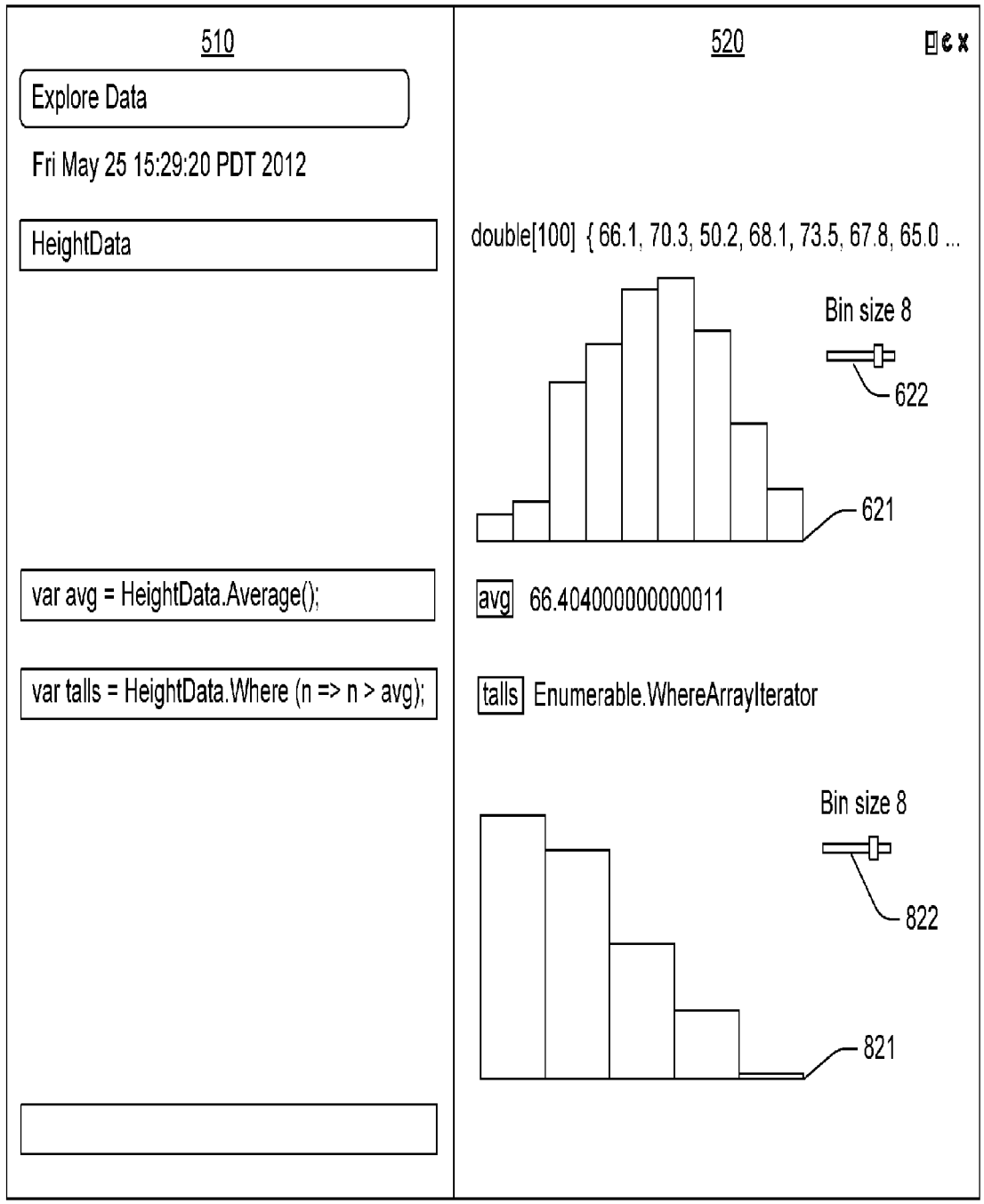

Next, the user can enter another line of code to create a variable called "talls" that includes the entries from HeightData that are greater than the average height. Another histogram 821 is presented in the results portion when the user enters the line of code, this time the histogram represents the variable "talls." The histogram can be initially presented with a bin size of 1 as shown by slider 822. FIG. 9 shows results section 520 in a configuration where the user has updated the bin size to 8. Here, the histogram now looks more like the right half of a typical statistical distribution.

As mentioned, the results section 520 can continue to be updated as incremental processing is performed. Thus, both histograms 621 and 821 can continue to update as further data items are processed by the stream engine. This enables the user to work with and see visualizations of the data in a single interface even before the queries being processed have fully completed.

Note that some implementations may involve configuring the stream engine 124 differently depending on the bin size. For example, the bin size may default to 1, and the stream engine can begin processing data items individually. Next, the user can adjust the slider to a value of 5, and then can subsequently adjust the slider to a value of 7. Each time the user moves the slider, the interface module 131-151 can generate events that contain the value of the slider as payload. When the value changes, the previous event can be configured to end and a new event can be provided to the stream engine.

For example, consider when the user moves the slider from 1 to 5. The interface module 131 can create an event with payload "5" and lifetime from [start_time=0] to [end_time=infinity], indicating that slider value is 5. Next, assume the user adjusts the slider at progress point 20 to a bin size of 7 instead. Two events are sent to the stream engine, (1) an end event that ends the previous slider value: payload=5, start time=0, new end time=20, old end time=infinity, and (2) a start event that starts a new slider value: payload=7, start time=20, end time=infinity.

Now, the stream engine 124 uses these events to change the grouping condition for the histogram to the newer value. For example, the histogram may be generated by a group and apply operation which would now have a different (more coarse-grained) grouping condition. For example, the grouping key might go from floor(user/5) to floor(user/7). This, in turn, would transition the histogram bins from a width of 5 users to a width of 7 users. Prior to the transition, users 0-4 are in bin 0, users 5-9 are in bin 1, users 10-14 are in bin 2, and so on. After the transition, users 0-6 are in bin 0, users 7-13 are in bin 1, and so on.

Second Example Script Code and Results

Figure 11:
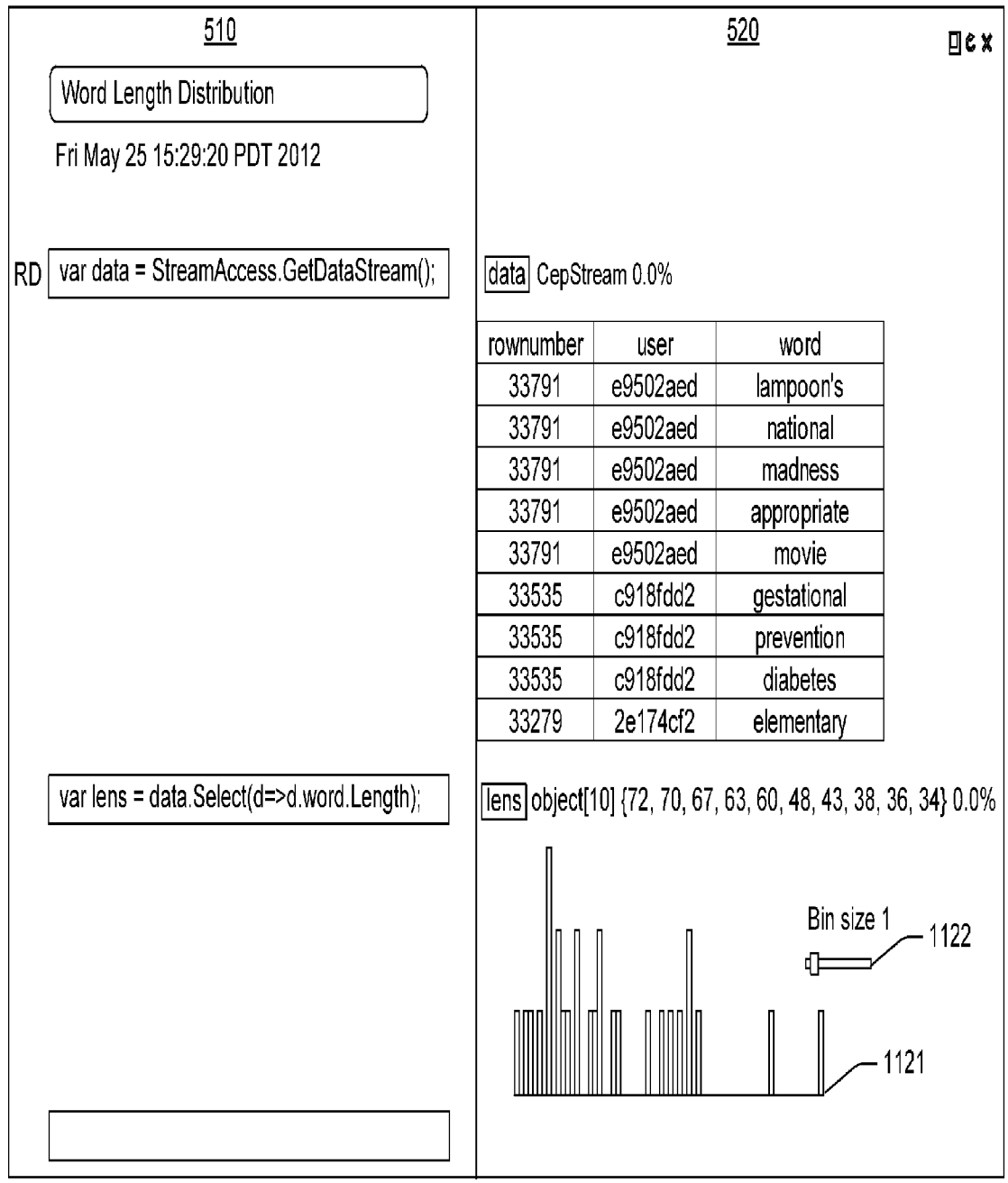
Figure 12:
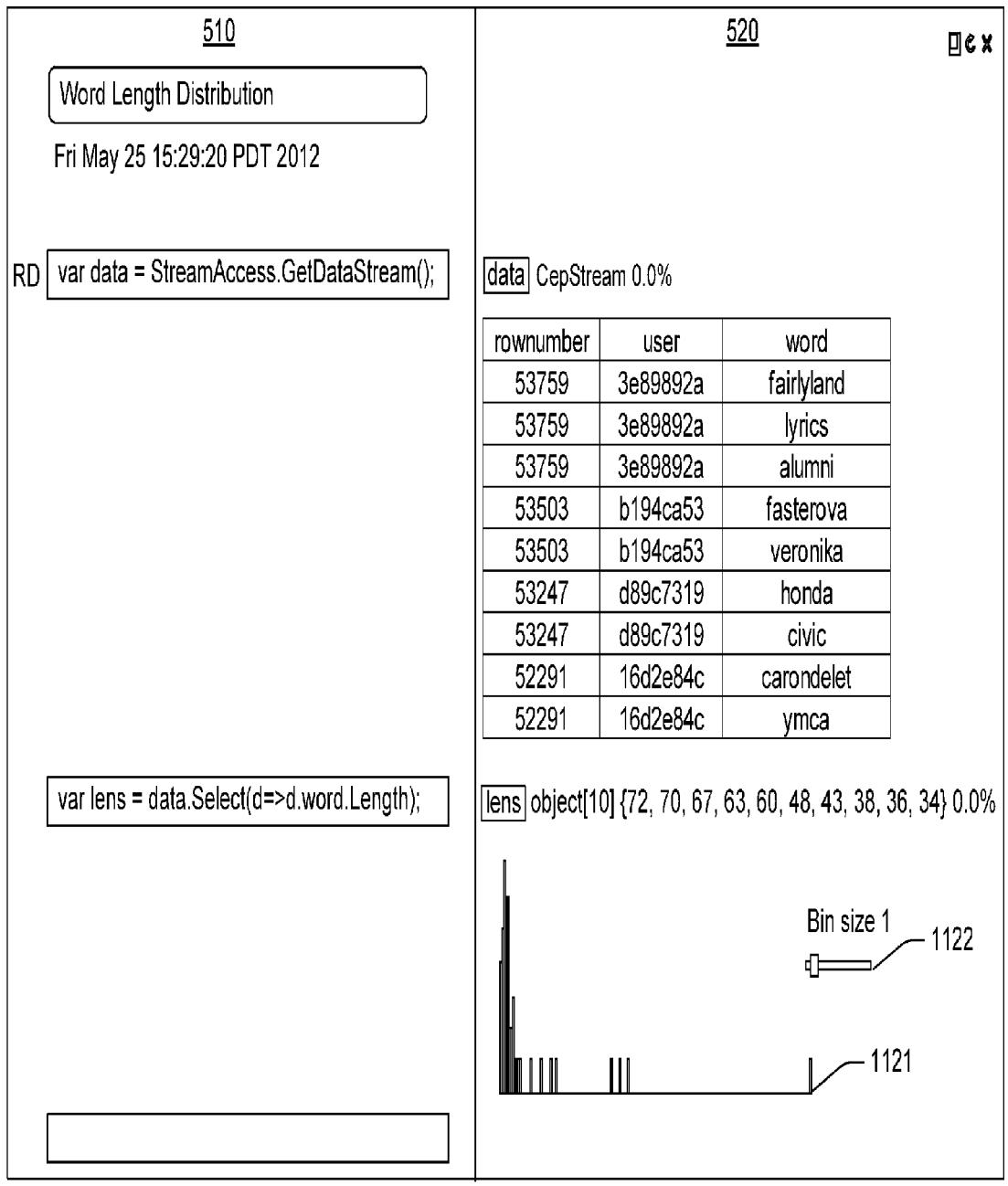

FIGS. 10-12 show code section 510 and results section 520 of GUI 500 for a different set of code entries of a script entitled "Word Length Distribution." In FIG. 10, a user named RD has entered a first line of code "var data=StreamAccess.GetDataStream( );" that populates a variable "data" with rows from a table. Here, the table includes search terms entered by users, e.g., from a search engine. The first 10 entries of the current progress interval are shown in the results section 520, e.g., the rows shown are the rows of the table for the most recent set of results. Note the user RD may be at a different client device and the initials are displayed to let other uses know which user entered that particular line of code.

In FIG. 11, another user (e.g., the local user) enters a second line of script code "var lens=data.Select (d=>d.word.Length);" that populates an array "lens" with lengths of the words from the variable "data." A histogram 1121 is displayed with an associated slider 1102. FIG. 12 shows results section 520 updated at a later time when more results have been processed. Note histogram 1121 can automatically adjust scales of both the x and y axis to accommodate results as they are processed, e.g., the scales shown in FIG. 12 can be adjusted relatives to the scales shown in FIG. 11.

Additional Histogram Implementations

Figure 13:
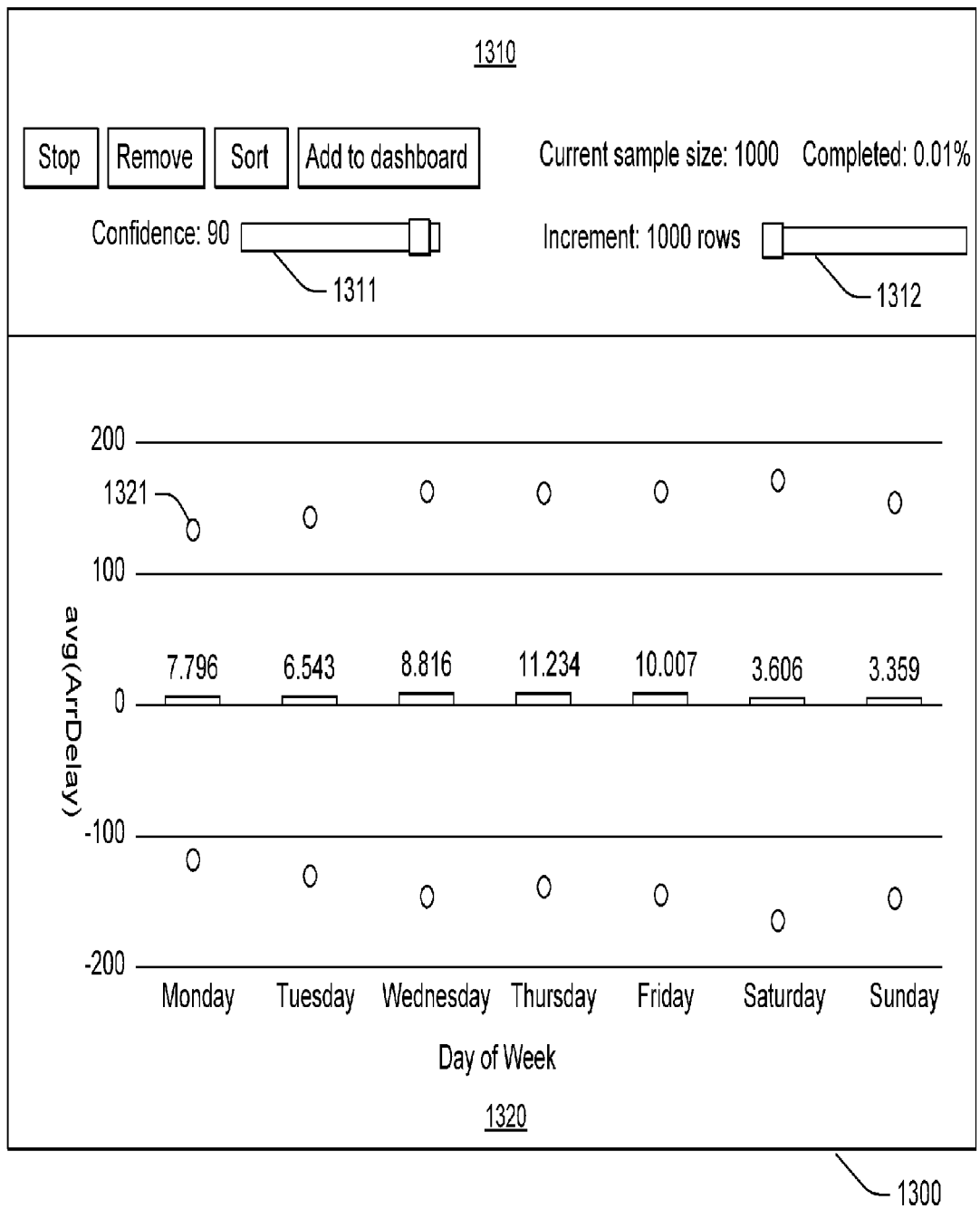

FIG. 13 illustrates an exemplary GUI 1300 that can be used in accordance with the disclosed implementations. GUI 1300 includes a configuration portion 1310 and a histogram portion 1320. The configuration portion includes options to configure how the histogram portion appears. For example, the user can stop processing of the query at any time, can configure a confidence interval using a slider 1311, and can configure a processing increment using a slider 1312. Effects of changing the confidence interval and the processing increment are discussed in more detail below. The configuration portion also gives a current sample size which indicates a number of data items that have been processed and a completed percentage that indicates the percentage of the data items that have already been processed.

GUI 1300 is shown in a configuration where the user has entered code with an integrated relational query that processes data such as that shown in table 200, e.g., flight delay data. Here, histogram portion 1320 shows individual columns representing delays for each day of the week, starting with Monday as day 1 and ending with Sunday as day 7. Although only 0.01% of the data has been processed, patterns are already beginning to emerge as Thursday and Friday (days 4 and 5) have noticeably longer delays than the weekend days (6 and 7).

Figure 14:
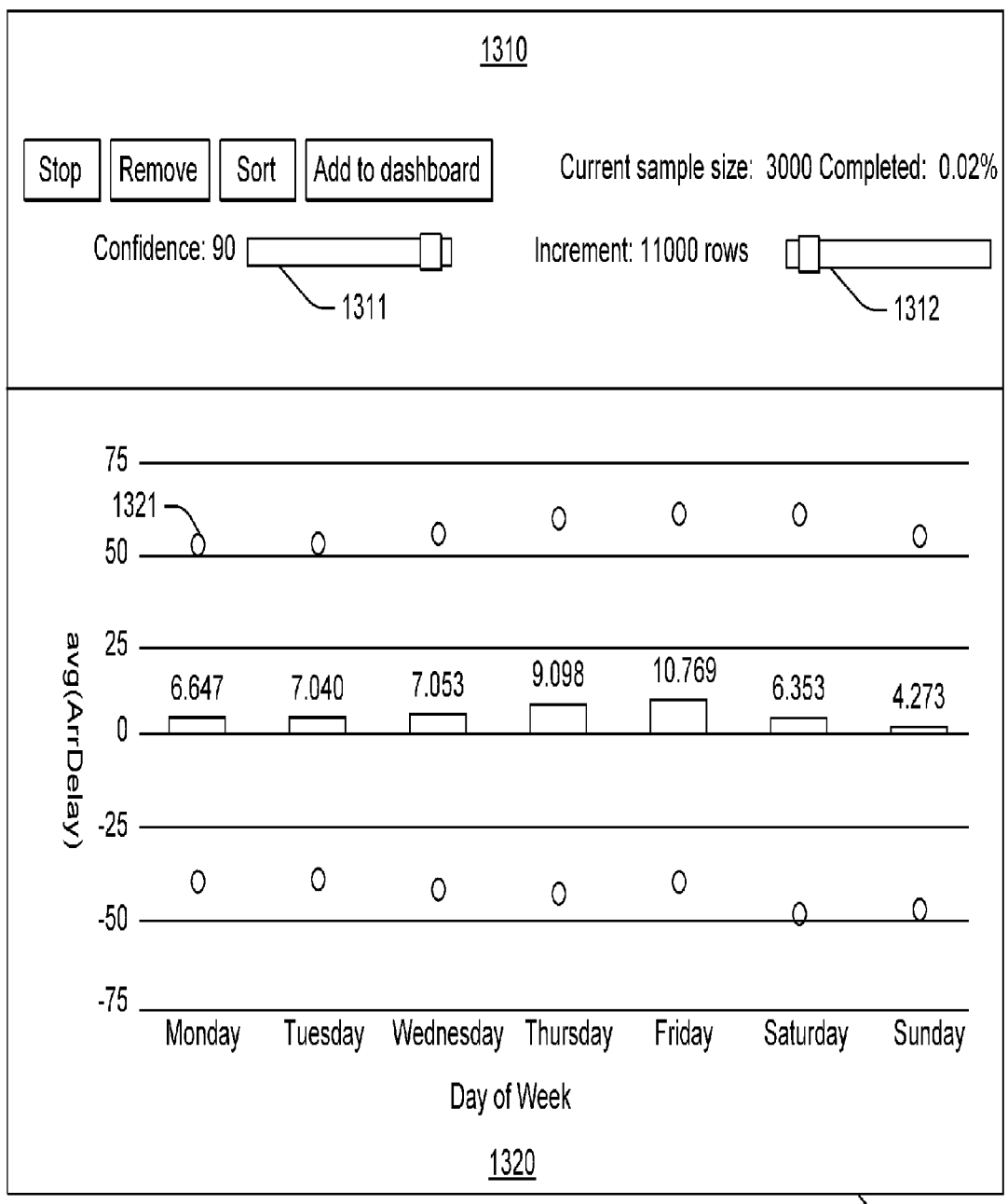
Figure 15:
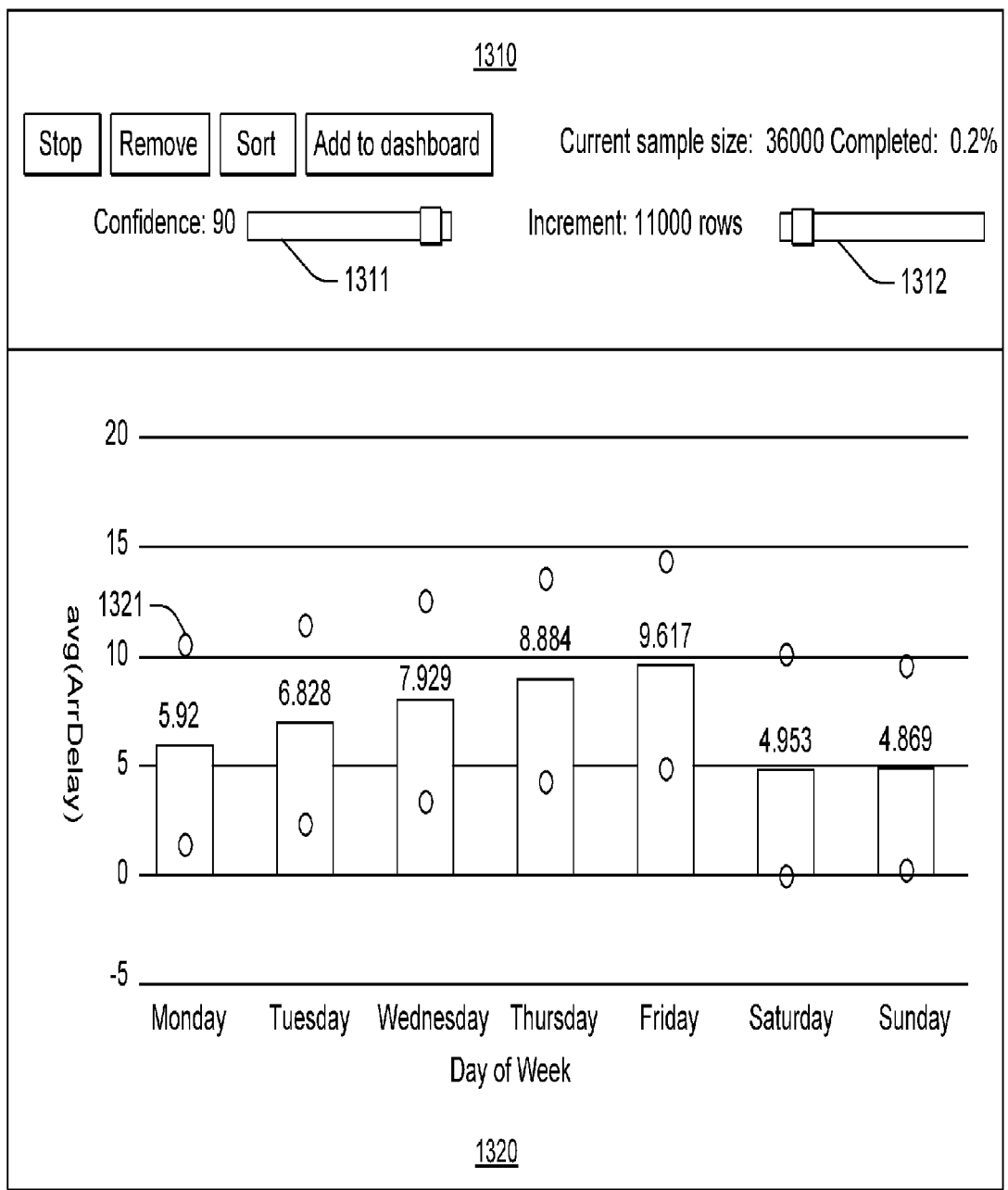

FIG. 14 shows GUI 1300 at a later time, after processing 3,000 rows of data. Here, it is becoming apparent that Friday delays are the longest, with Thursday a close second. FIG. 15 continues with the example, showing GUI 1300 after processing 36,000 rows of flight data. Now it is clear that the weekend days have the shortest delays, on average.

By presenting incremental results as shown in FIGS. 13-15, the user is able to see relatively quickly the relationship between different days of the week and airport delays. Here, the results over just the first 1,000 data items provide some meaningful understanding of the characteristics of the underlying data. Some implementations are tunable and allow the user to select, via the GUI 1300, how often a partial result is computed. Compare FIGS. 13 and 14 and note the user has adjusted the Increment slider 1312 to change the number of rows that contribute to each incremental result. This can cause the adapter module 125 to change the lifetime of the underlying data items.

For example, if 10,000 records have been processed at a granularity of 1,000 records per tick, then the tick counter in the stream engine may have a current value of 10. Now, when the interval is set to 11,000, the next tick value of 11 will mean 11,000 more records have been processed—a total of 21,000. In other words, records 10,001 through 21,000 are processed at tick 11. Accordingly, the adapter module 125 can set the lifetime of records 21,000-31,999 to begin at 11 and end at infinity, the lifetime of records 32,000-43,999 can be set to begin at 12 and end at infinity, and so on. Now, the user will receive updates less frequently but each update will correspond to relatively larger subsets of data contributing to the results. In this sense, the user can "tune" the processing to receive results at a preferred level of granularity.

Also, note that histogram portion 1320 can represent confidence intervals using circles 1321. The circles represent upper and lower bounds of confidence of the query results as set by confidence slider 1311. As the confidence intervals change, the y-axis of the histogram can change scale to fit the confidence results within the histogram portion. Thus, the confidence interval gets progressively narrower from FIGS. 13 to 15 as the y-axis scale becomes smaller and smaller. This is because the confidence interval itself becomes smaller as more and more data items are processed. Some implementations use dataset minima and maxima as well as already observed variance to calculate these confidence bounds and display these on the visualizations. Aggregations such as sums and means can be updated and the confidence bounds can narrow as server updates are received.

Programming Implementations

Generally, the graphical interfaces discussed herein can interact with the server 120 to provide a unified scripting environment that enables users to interactively process large amounts of data. One specific implementation uses language-integrated query ("LINQ") techniques to incorporate queries (e.g., SQL) into a general-purpose programming language such as C#. The code entries shown above generally illustrate this technique. In some implementations, the client devices 130-150 use Hypertext Markup Language (HTML), asynchronous JavaScript® and Extensible Markup Language (XML), and/or other technologies to communicate with the web service 121.

Referring back to the GUI 500 as shown in FIG. 5, the GUI can be used to provide a two-column read-eval-print loop (REPL), where code section 510 includes the left column of the REPL and results section 520 includes the right column of the REPL. In the left column, the user types commands (C# statements or expressions); in the right column, the client device displays the command result. The client device can send these commands to the server for evaluation when the user presses "enter" and receive incremental results from the server as they are computed by the stream engine 124.

Some of the commands entered in code section 510 can include LINQ code that identifies one or more relational queries. For example, consider code entry 512 in FIG. 5. Here, the language "d.word.Length" can be regarded a SELECT operator that is implemented using a streaming select operation. For each incoming event (e.g., row) the streaming select operation selects the word length attribute. Note in this instance that the "Pick" operator can be regarded as a user-defined operator.

Each code entry can have associated results of different types. In the case where the result is a simple scalar, the client device can draw a print string in the result section 520. However, when the result is a more complex object, the client device can choose a default visualization for the data: for tabular data, a table for streams of numbers, a histogram for streams of pairs of numbers, a scatter plot; etc. In any event, the user can be provided with the default visualization simply by entering a query that produces a result. If the default visualization does not fit the user's needs, the user can interactively switch the visualization type and change its parameters. For example, the user may be able to interactively switch between histograms and scatterplots via one or more drop-down menus or other selection options.

In some implementations, script commands are automatically rewritten by either the interface modules 131-151 or the web service 121. For example, when a script accesses an enumeration (IEnumerable<T> in .NET), the enumeration can be wrapped in a data stream (CepStream<T> in StreamInsight®) suitable for processing by the stream engine 124. Every time unit, the web service 121 can report a summary of the results back to the client device as well as report overall progress. For data sources whose size is known, this can be reported as the percent completed; for other sources, the number of items processed.

Hardware Implementations

As mentioned earlier, system 100 is one example of a system in which techniques such as those discussed above can be performed. For example, other exemplary systems may perform some or all of the disclosed functionality on a single device. Furthermore, functional components such as an interface module, adapter module, stream engine, database, script storage, and/or web service can be implemented as software, hardware, and/or firmware. Processors can execute computer-readable instructions to provide any of the functionality discussed herein, e.g., method 300 and associated processing. Data and/or computer-readable instructions can be stored on memory and/or storage. The memory and storage can include any one or more of volatile or non-volatile memory devices, hard drive storage devices, and/or optical storage devices (e.g., CDs, DVDs etc.), flash storage devices, etc.

In some cases, the various functional components discussed herein can be installed on the associated client device or server during assembly or at least prior to delivery to the user. In other scenarios, functional components can be installed after delivery, such as a download available over network 110 and/or from a removable storage device. The functional components can be manifest as freestanding applications or services, individual application modules, as part of an operating system, etc.

It is also worth noting that in some instances, the client devices or server can comprise multiple computing devices or machines, such as in a distributed environment. In such a configuration, method 300 can be implemented using distributed processing across the multiple computing devices or machines. The terms "computer," "client device," "server," and "computing device" as used herein can mean any type of device that has some amount of processing capability and/or storage capability. Generally, a "mobile device" refers to a computing device embodied in a form factor suitable for a user to carry on their person. A computing device can obtain computer-readable instructions that are stored on storage devices and/or memory devices. Also, note that the term "system" can refer to a single device or multiple devices. Such devices can include various input/output mechanisms such as keyboards, displays, touchscreens (e.g., typing and/or gesture inputs), voice-activated interfaces, etc.

As used herein, the term "computer-readable media" can include signals. In contrast, the term "computer-readable storage media" excludes pure signals and implies some physical structure. Computer-readable storage media includes "computer-readable storage devices." Examples of computer-readable storage devices include volatile storage media, such as RAM, and non-volatile storage media, such as hard drives, optical discs, and flash memory, among others.

In addition to the illustrated configurations of FIG. 1, computing devices consistent with the disclosed implementations can employ a system on a chip (SOC) type design. In such a case, functionality provided by the computer can be integrated on a single SOC or multiple coupled SOCs. One or more processors can be configured to coordinate with shared hardware, such as memory, storage, etc., and/or one or more dedicated hardware resources, such as hardware blocks configured to perform certain specific functionality. Thus, the term "processor" as used herein can also refer to controllers, microcontrollers, processor cores, or other types of processing devices suitable for implementation both in conventional computing architectures as well as SOC designs. In this context, the term "execute" in association with a processor/processing device can include functionality such as routing data and/or instructions to various dedicated hardware resources. The term "logic" encompasses both hardware modules and software instructions or modules.

CONCLUSION

The order in which the example methods are described is not intended to be construed as a limitation, and any number of the described blocks or acts can be combined in any order to implement the methods, or alternate methods. Furthermore, the methods can be implemented in any suitable hardware, software, firmware, or combination thereof, such that a computing device can implement the methods. In one case, the methods are stored on one or more computer-readable storage media as a set of instructions such that execution by one or more computing devices causes the one or more computing devices to perform the method.

Although techniques, methods, devices, systems, etc., discussed herein are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method comprising:
    obtaining a relational query that references relational data items from a relational data table that lacks an explicit temporal attribute for ordering the relational data items of the relational data table; and
    adapting the relational data items for processing by a stream engine by associating explicit temporal data with the relational data items, the explicit temporal data comprising different lifetimes.

2. The method of claim 1, further comprising:
    receiving code; and
    processing the code to derive the relational query.

3. The method of claim 1, further comprising:
    assigning the different lifetimes to stream events processed by the stream engine, the stream events corresponding to individual rows of the relational data table.

4. The method of claim 3, further comprising:
    creating the different lifetimes based at least on row numbers of the relational data table.

5. The method of claim 4, wherein the different lifetimes include different end times for at least some of the relational data items.

6. The method of claim 1, further comprising:
    grouping multiple rows of data items together into a first set of multiple first rows of data items and a second set of multiple second rows of data items; and
    adapting the multiple rows of data items for processing by the stream engine by:
    assigning a first progress interval to the first set of multiple first rows; and
    assigning a second progress interval to the second set of multiple second rows.

7. A system comprising:
    one or more processors; and
    one or more computer-readable storage media comprising instructions which, when executed by the one or more processors, cause the one or more processors to:
    access relational data items from a relational data table that lacks an explicit temporal attribute for ordering the relational data items of the relational data table; and
    adapt the relational data items for processing by a stream engine by associating explicit temporal data with the relational data items.

8. The system of claim 7, wherein the instructions, when executed by the one or more processors, cause the one or more processors to:
    adapt the relational data items by defining different lifetimes for different sets of relational data items.

9. The system of claim 8, wherein the instructions, when executed by the one or more processors, cause the one or more processors to:
    assign different begin lifetimes to each set of relational data items; and
    assign a common end lifetime to the different sets of relational data items.

10. The system of claim 7, wherein the instructions, when executed by the one or more processors, cause the one or more processors to:
    identify a partitioning attribute, other than a row number, of a query that references the relational data items;
    group the relational data items into different sets of relational data items, each relational data item in a given set sharing the same value for the partitioning attribute; and
    use the partitioning attribute as a progress attribute for the stream engine.

11. The system of claim 10, wherein the instructions, when executed by the one or more processors, cause the one or more processors to:
    use the partitioning attribute as the progress attribute by assigning different lifetimes to each set of relational data items.

12. The system of claim 11, wherein the instructions, when executed by the one or more processors, cause the one or more processors to:
    assign different begin lifetimes to each set of relational data items.

13. The system of claim 12, wherein the instructions, when executed by the one or more processors, cause the one or more processors to:
    assign different end lifetimes to each set of relational data items.

14. The system of claim 13, wherein the instructions, when executed by the one or more processors, cause the one or more processors to:
    assign a common end lifetime for results provided by the stream engine when processing the relational data items.

15. A hardware computer-readable storage media storing instructions which, when executed by one or more hardware processors, cause the one or more hardware processors to perform acts comprising:
    obtaining a relational query that references relational data items from a relational data table that lacks an explicit temporal attribute for ordering the relational data items of the relational data table; and adapting the relational data items for processing by a stream engine by associating explicit temporal data with the relational data items.

16. The hardware computer-readable storage media of claim 15, the explicit temporal data defining lifetime windows for the stream engine to process the relational data items.

17. The hardware computer-readable storage media of claim 16, the lifetime windows having different begin lifetimes and a shared end lifetime.

18. The hardware computer-readable storage media of claim 17, the shared end lifetime being infinity.

19. The hardware computer-readable storage media of claim 17, the acts further comprising:

setting a first begin lifetime for multiple first rows of the relational data items; and setting a second begin lifetime for multiple second rows of the relational data items.

20. The hardware computer-readable storage media of claim 15, the acts further comprising:

deriving the relational query from script code.

* * * * *